(12) United States Patent
Desormeau et al.

(10) Patent No.: US 12,576,671 B2
(45) Date of Patent: Mar. 17, 2026

(54) TIRE HANDLER HAVING TIRE LAY FLAT CAPABILITY

(71) Applicant: NORDIC MINESTEEL TECHNOLOGIES INC., North Bay (CA)

(72) Inventors: Wayne Desormeau, Callander (CA); Guy Mathieu, North Bay (CA)

(73) Assignee: NORDIC MINESTEEL TECHNOLOGIES INC., North Bay (CA)

( * ) Notice: Subject to any disclaimer, the term of this patent is extended or adjusted under 35 U.S.C. 154(b) by 322 days.

(21) Appl. No.: 18/283,840

(22) PCT Filed: Mar. 24, 2022

(86) PCT No.: PCT/CA2022/000014
§ 371 (c)(1),
(2) Date: Sep. 25, 2023

(87) PCT Pub. No.: WO2022/204783
PCT Pub. Date: Oct. 6, 2022

(65) Prior Publication Data
US 2024/0165992 A1 May 23, 2024

Related U.S. Application Data

(60) Provisional application No. 63/168,226, filed on Mar. 30, 2021.

(51) Int. Cl.
*B60B 30/02* (2006.01)
*B60B 30/10* (2006.01)
(52) U.S. Cl.
CPC .............. *B60B 30/02* (2013.01); *B60B 30/10* (2013.01)

(58) Field of Classification Search
CPC ......... B60B 30/02; B60B 30/10; B60B 29/00; B60B 29/001; B60B 29/002; B62B 2203/031; B66F 9/184
(Continued)

(56) References Cited

U.S. PATENT DOCUMENTS

| 2,756,883 A | 7/1956 | Schreck |
| 3,830,388 A | 8/1974 | Mott |

(Continued)

FOREIGN PATENT DOCUMENTS

| JP | H08132807 A | 5/1996 |
| WO | 2014/119337 A1 | 8/2014 |
| WO | 2020/194226 A1 | 10/2020 |

OTHER PUBLICATIONS

International Searching Authority (ISA/CA), International Search Report and Written Opinion, mailed Jul. 26, 2022, for related International Patent Application No. PCT/CA2022/000014.

*Primary Examiner* — Mark C Hageman
(74) *Attorney, Agent, or Firm* — CONNEELY PC; Joseph Conneely

(57) ABSTRACT

A tire handler for handling a tire of a vehicle, comprising: a frame; a tire gripping assembly having a tilt assembly and an arm assembly coupled thereto; the arm assembly having first and second vertical telescoping arms and first and second horizontal telescoping arms; the arm assembly having first and second upper arms and first and second lower arms; and, a lifting assembly, the lifting assembly having first and second vertical lift actuators mounted on the frame and coupled to the tilt assembly; wherein the tire gripping assembly is operable to release and grip the tire; wherein the lifting assembly is operable to lower and raise the tire; and, wherein the tilt assembly is operable to stand upright and lay flat the tire.

17 Claims, 34 Drawing Sheets

(58) Field of Classification Search
 USPC .............. 414/426, 427, 429; 294/81.21, 81.2
 See application file for complete search history.

(56) References Cited

U.S. PATENT DOCUMENTS

| | | | | |
|---|---|---|---|---|
| 4,401,405 | A | 8/1983 | Ealet | |
| 7,635,134 | B2 * | 12/2009 | Hedley | ................. E02F 3/3604 |
| | | | | 414/427 |
| 9,096,095 | B2 * | 8/2015 | Hedley | ................... B60B 29/00 |
| 9,573,420 | B2 * | 2/2017 | Hedley | .................... B66F 7/22 |
| 11,834,314 | B2 * | 12/2023 | Córdova | ................. B60B 30/02 |
| 2005/0254923 | A1 | 11/2005 | Gorski et al. | |
| 2010/0166531 | A1 * | 7/2010 | Bauer | .................... B66F 9/183 |
| | | | | 414/429 |
| 2015/0151576 | A1 | 6/2015 | Grengs | |

* cited by examiner

TIRE HANDLER HAVING TIRE LAY FLAT CAPABILITY

This application claims priority from U.S. Patent Application No. 63/168,226, filed Mar. 30, 2021, and the entire content of such application is incorporated herein by reference, and is a national phase entry of International Patent Application No. PCT/CA2022/000014, filed Mar. 24, 2022, and the entire content of such application is incorporated herein by reference.

FIELD OF THE APPLICATION

This application relates to the field of tire handling devices or tire handlers, and more specifically, to a tire handler for handling the tires of large capacity trucks, such as open pit mining haulage trucks, and the like.

BACKGROUND

Large capacity open pit mining haulage trucks require specialized tire handling devices or tire handlers for replacing worn out or flat tires. These trucks may have capacities of up to 400 tons and may have tires up to 16 feet in diameter and weighting up to 10 tons.

Over the past 100 years mining has transformed at a rapid rate. Production rates have increased and trucks are larger than ever previously imagined. With mine sites operating 24/7 in extreme climates, routine tire maintenance for these giant earth movers is essential for continuous production.

With pressure to increase safety, turnaround time, and truck availability while performing tire maintenance, mine management and large service providers are seeking an improved tire handling solution that could replace the typical equipment forklift and globally used tire handler attachment equipment currently used in shop environments. One problem with existing tire handling devices is that while trucks are getting larger, the shops used to maintain them remain the same size, thus limiting the usefulness of such existing devices.

A need therefore exists for an improved tire handler or tire handling device for large capacity trucks and the like. Accordingly, a solution that addresses, at least in part, the above and other shortcomings is desired.

SUMMARY OF THE APPLICATION

According to one aspect of the application, there is provided a tire handler for handling a tire of a vehicle (e.g., a truck or large capacity truck), comprising: a frame; a tire gripping assembly having a tilt assembly and an arm assembly coupled thereto; the arm assembly having first and second vertical telescoping arms coupled at respective upper and lower ends to respective first and second ends of first and second horizontal telescoping arms; the arm assembly having first and second upper arms and first and second lower arms mounted on the first and second vertical telescoping arms proximate the respective upper and lower ends thereof, the first and second upper arms and the first and second lower arms adapted to grip the tire; the first and second vertical telescoping arms having respective first and second vertical arm actuators; the first and second horizontal telescoping arms having respective first and second pairs of horizontal arm actuators; and, a lifting assembly mounted on the frame, the lifting assembly having first and second vertical lift actuators mounted on the frame and coupled to the tilt assembly; wherein the first and second vertical arm actuators and the first and second pairs of horizontal arm actuators are operable to move the first and second upper and lower arms between an expanded position and a contracted position to thereby release and grip the tire; wherein the first and second vertical lift actuators are operable to move the tire gripping assembly between a lowered position and a raised position to thereby lower and raise the tire; and, wherein the tilt assembly is operable to move the arm assembly between a vertical position and a horizonal position to thereby stand upright and lay flat the tire.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain structures, techniques and methods have not been described or shown in detail in order not to obscure the application.

Figure 1:
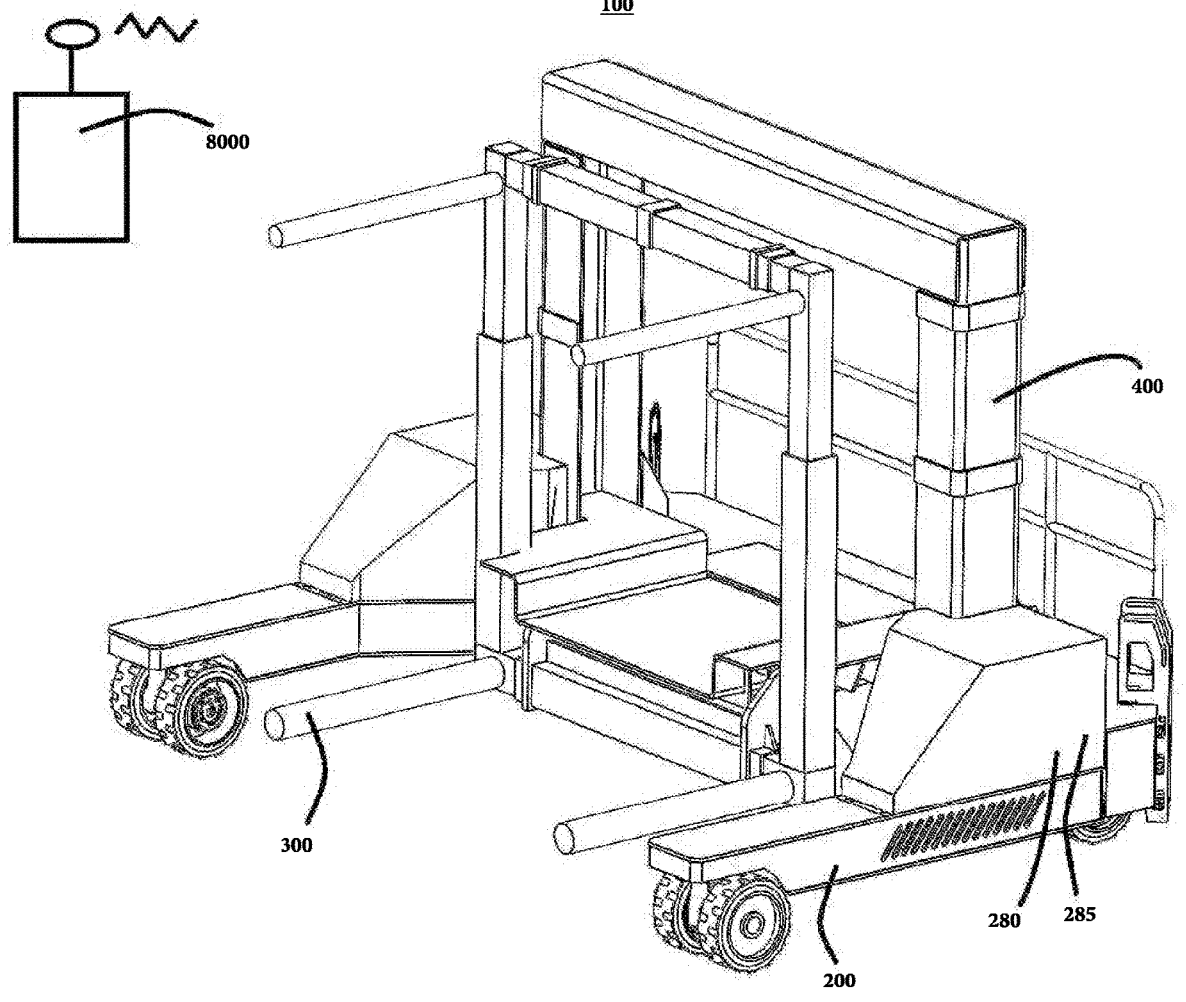
FIG. 1 is a front perspective view illustrating a tire handler in accordance with an embodiment of the application.
Figure 2:
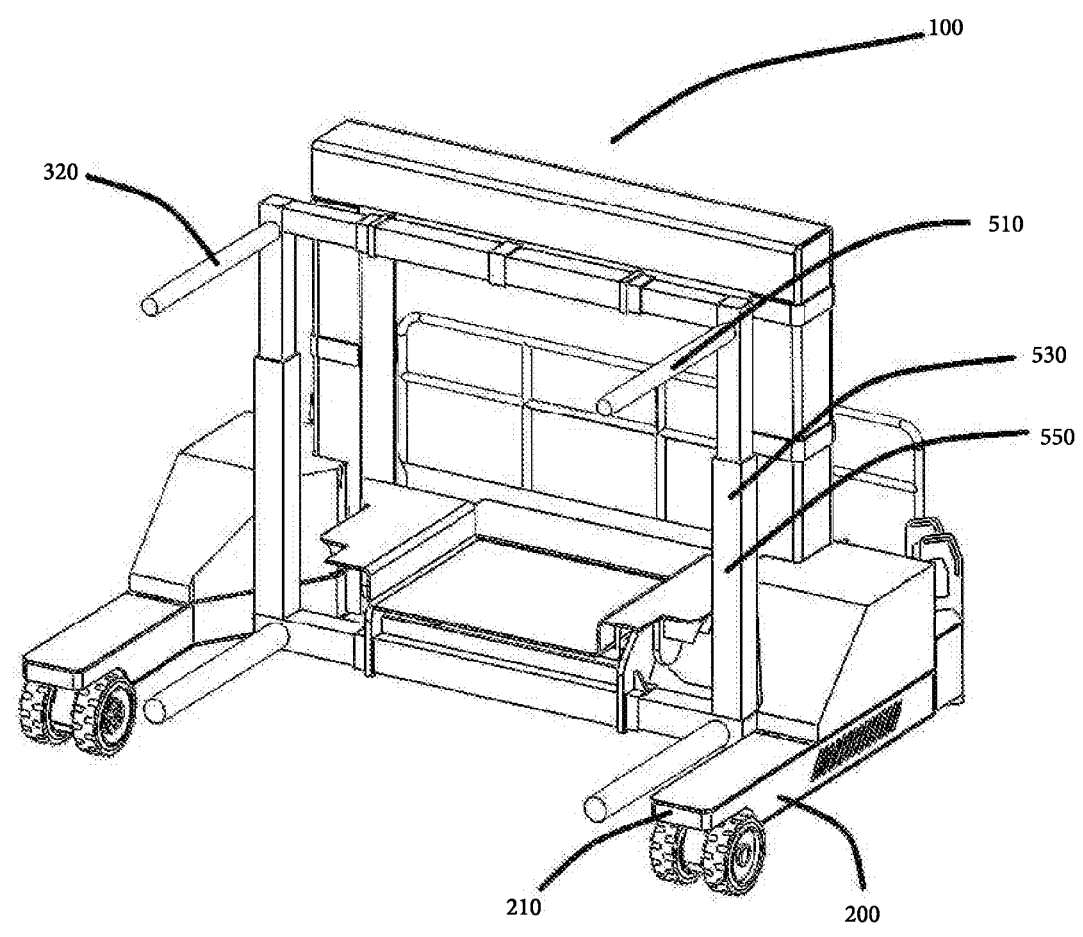
FIG. 2 is a front perspective view illustrating the tire handler of FIG. 1 with the arm assembly thereof shown in a vertical, lowered, and expanded position in accordance with an embodiment of the application.
Figure 3:
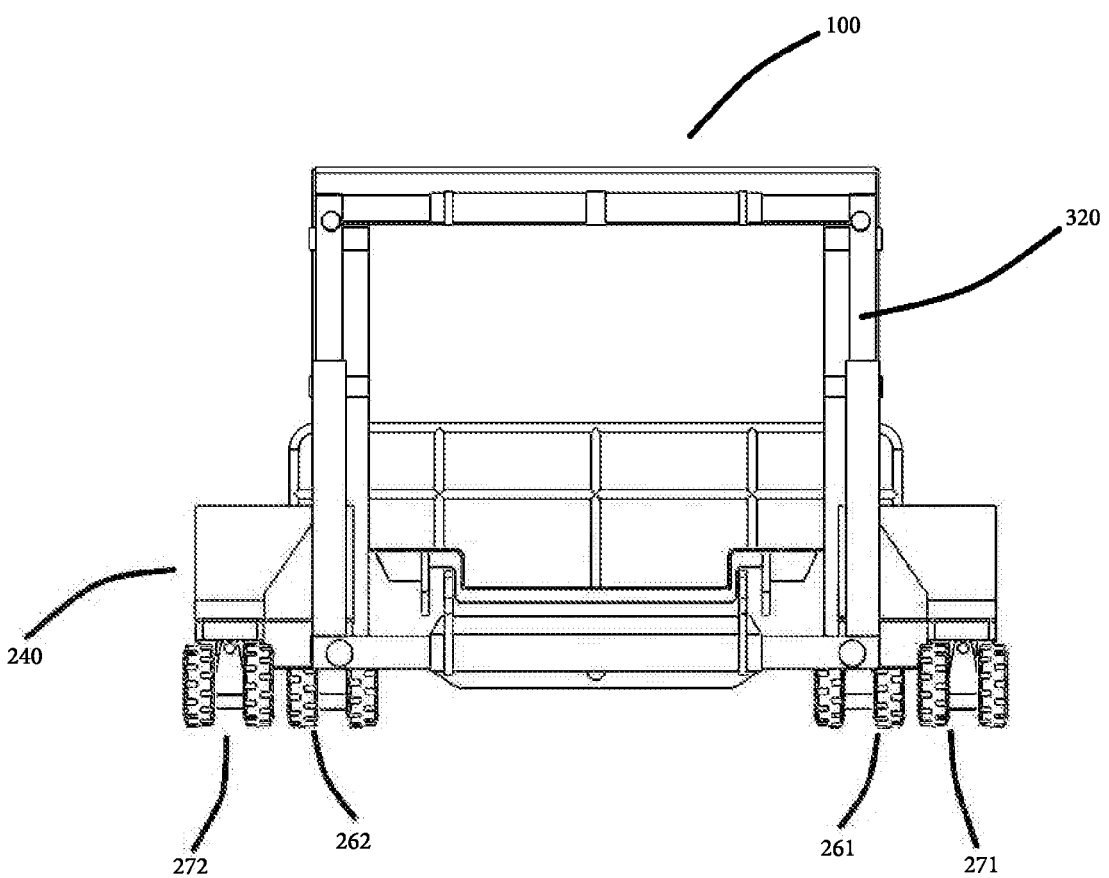
FIG. 3 is a front view thereof.
Figure 4:
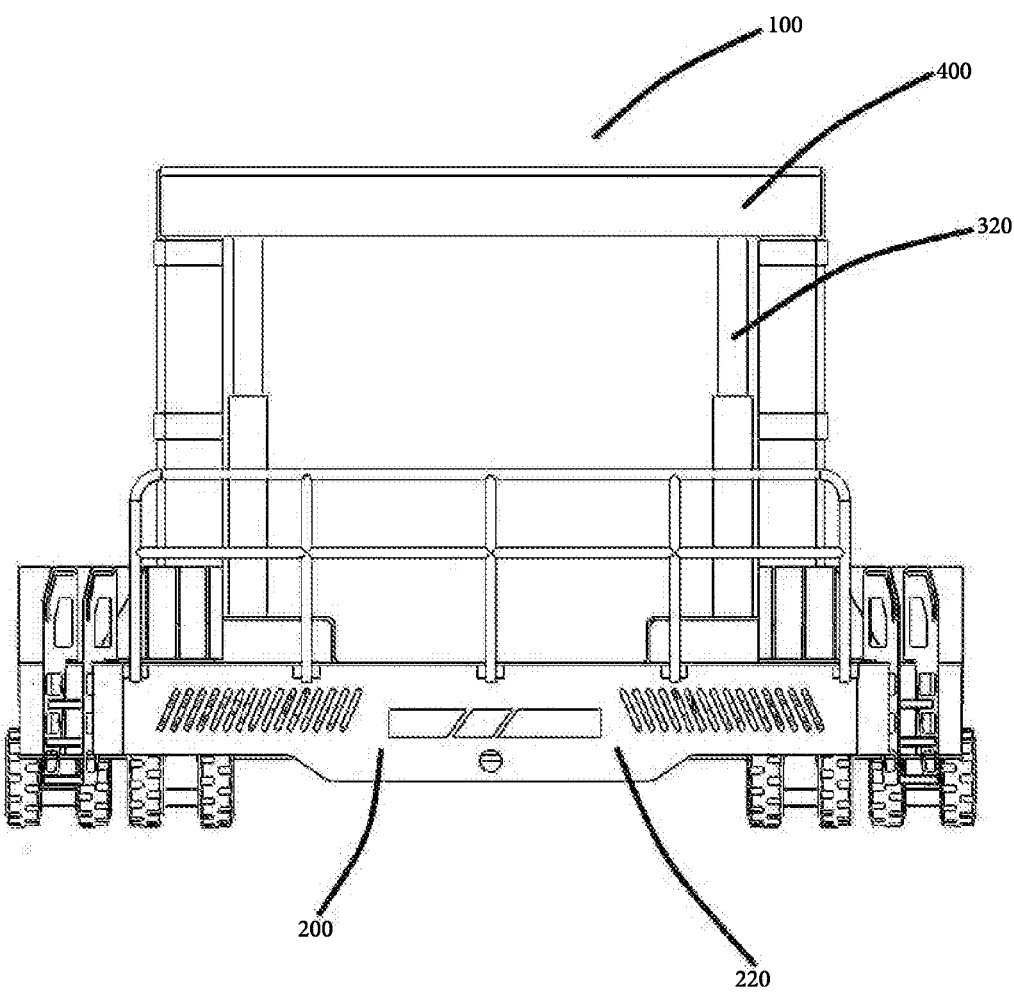
FIG. 4 is a rear view thereof.
Figure 5:
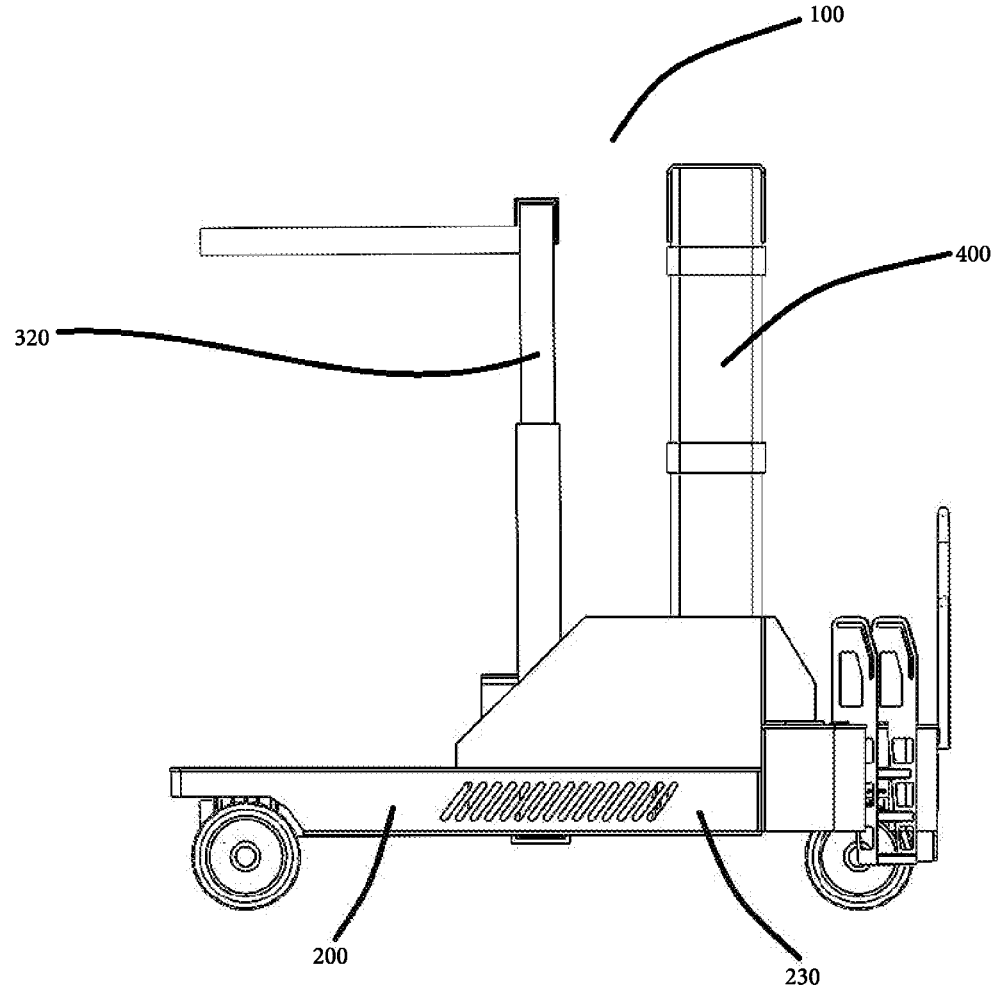
FIG. 5 is a right side view thereof, the left side view being substantially a mirror image thereof.
Figure 6:
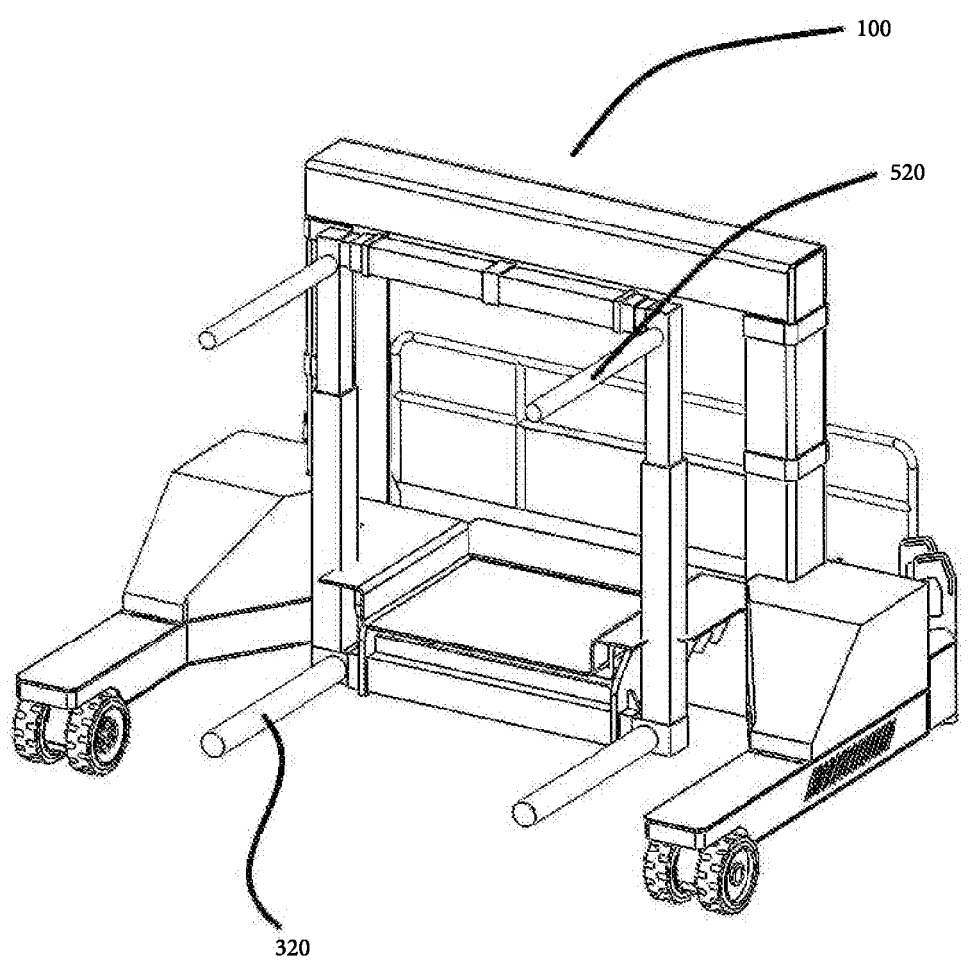
FIG. 6 is a front perspective view illustrating the tire handler of FIG. 1 with the arm assembly thereof shown in a vertical, lowered, and contracted position in accordance with an embodiment of the application.
Figure 7:
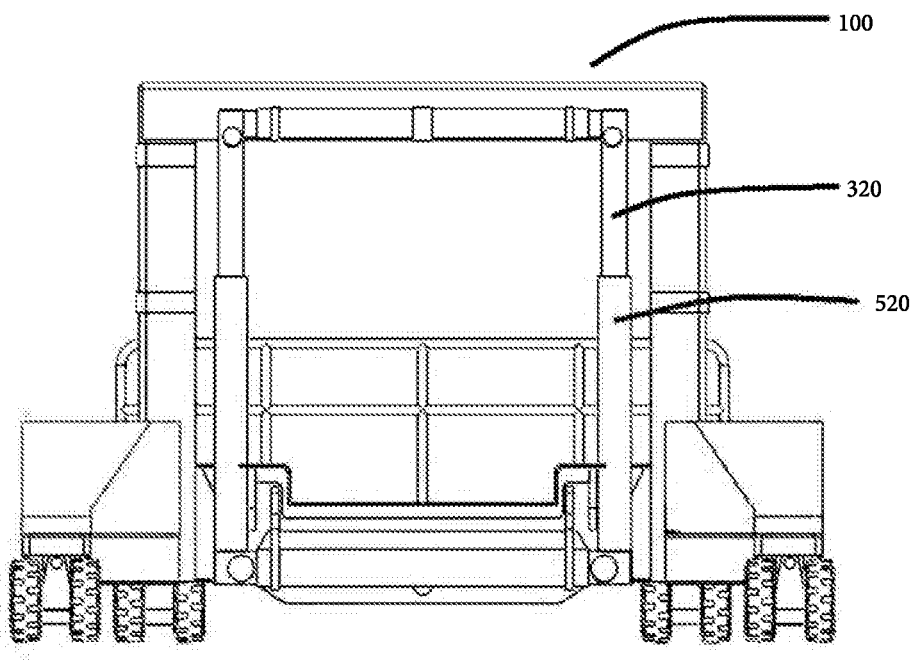
FIG. 7 is a front view thereof.
Figure 8:
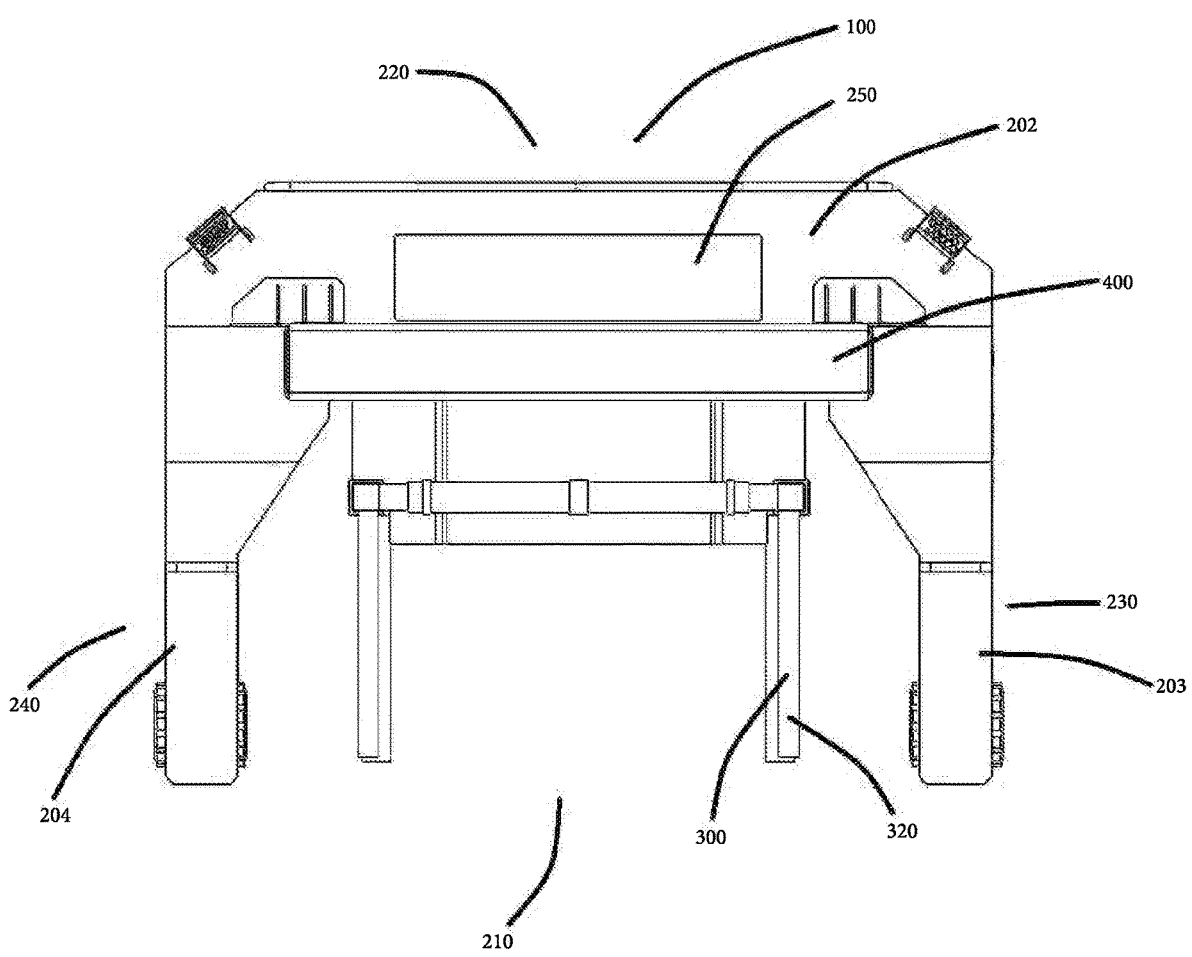
FIG. 8 is a top view thereof.

FIG. 1 is a front perspective view illustrating a tire handler 100 in accordance with an embodiment of the application. FIG. 2 is a front perspective view illustrating the tire handler 100 of FIG. 1 with the arm assembly 320 thereof shown in a vertical, lowered, and expanded position 550, 530, 510 in accordance with an embodiment of the application. FIG. 3 is a front view thereof. FIG. 4 is a rear view thereof. FIG. 5 is a right side view thereof, the left side view being substantially a mirror image thereof. FIG. 6 is a front perspective view illustrating the tire handler 100 of FIG. 1 with the arm assembly 320 thereof shown in a vertical, lowered, and contracted position 550, 530, 520 in accordance with an embodiment of the application. FIG. 7 is a front view thereof. And, FIG. 8 is a top view thereof.

According to one embodiment of the application, there is provided a tire handler 100 for handling a tire (or tire and tire rim or wheel) 1010 of a vehicle (e.g., a truck or large capacity truck) 1000. The tire handler 100 includes a frame 200, a tire gripping (or gripper) assembly 300, and a lifting assembly 400. As further described below, the tire handler 100 advantageously provides: 4-point contact of the tire 1010 (i.e., via first and second upper and lower arms 371, 372, 373, 374 as described further below); pressure sensing of the grip applied to the tire 1010 performed using on-board pressure sensors and programed algorithms to ensure safe operation of tire handler 100; reduced slipping of the tire 1010 and fall hazards for operators; six built-in hydraulic cylinders (all cylinders having electronic feedback) 331, 341, 351, 352, 361, 362 which allow for grip and side shift of at least the arm assembly 320 of the tire gripping assembly 300 through programed algorithms; a frame 200 having a built in work platform or deck 250 for operators and tire technicians; and, tire lay down "tilt" 555 capability.

According to one embodiment, the frame 200 has a front end 210, a rear end 220, a right side 230, and a left side 240. The frame 200 includes a platform or deck 250 for use by an operator. The tire handler 100 may further include a pair of omni steerable front wheels 261, 262 mounted proximate to the front end 210 of the frame 200. The tire handler 100 may further include a pair of omni steerable rear wheels 271, 272 mounted proximate to a rear end 220 of the frame 200. According to one embodiment, the wheels 261, 262, 271, 272 may be hydraulically or electrically driven.

According to one embodiment, the tire handler 100 may be self-propelled and has mounted on its frame 200 an electric motor (or optionally a diesel engine or hybrid engine) 280 and battery 285 for powering the wheels 261, 262, 271, 272, actuators (e.g., 331), and other components (e.g., sensors, communications equipment, etc.) of the tire handler 100. According to one embodiment, the operation and positioning of the tire handler 100 is remotely controllable using a handheld remote control unit 8000 operated by an operator. The remote control unit 8000 allows for controlling the tire handler 100 from a location distant from the tire handler 100, the tire 1010, and the truck 1000. According to another embodiment, the tire handler 100 may be controlled locally.

Figure 18:
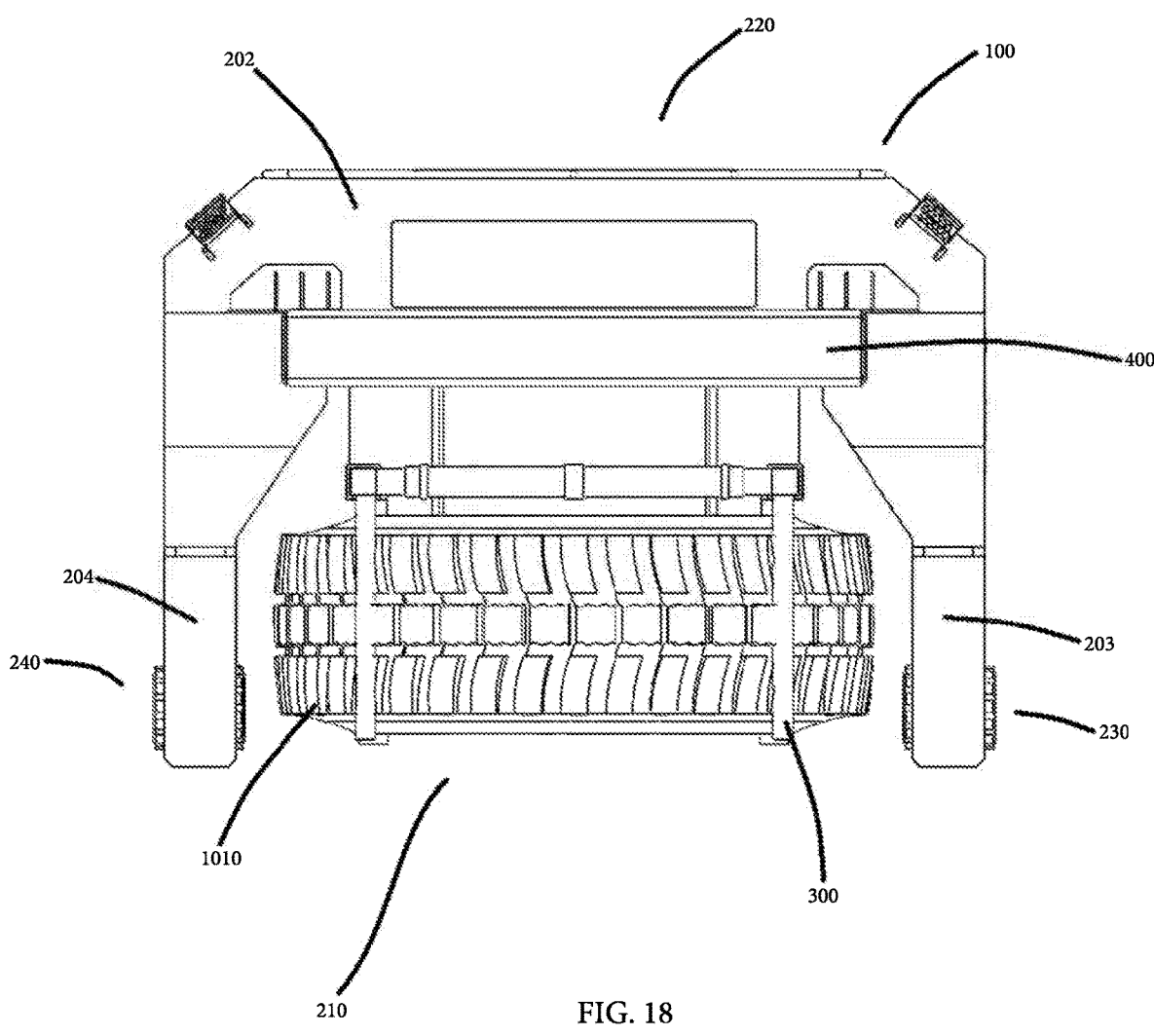
FIG. 18 is a top view thereof.

According to one embodiment, and referring to FIGS. 8 and 18, the frame 200 may be U-shaped or horseshoe shaped (or approximately U-shaped or horseshoe shaped) having a first (or right) leg or portion 203 on the right side 230 of the frame 200, a second (or left) leg or portion 204 on the left side 240 of the frame 200, and a central portion 202 at the rear end 220 of the frame 200. The front wheels 261, 262 may be mounted proximate the front end 210 of each leg 203, 204 on the underside thereof. The rear wheels 271, 272 may be mounted proximate right and left sides 230, 240 of the central portion 202 on the underside thereof proximate the rear end 220 of the frame 200. For improved stability, the tire gripping assembly 300 may extend from the lifting assembly 400 toward the front 210 of the frame 200 between the first and second legs 203, 204. Advantageously, the U-shaped design of the frame 200 reduces cantilever load (i.e., reduces the need for reach and loading on the first and second upper and lower arms 371, 372, 373, 374 of the tire gripping assembly 300) as the first and second legs 203, 204 may be positioned on either side (i.e., toward 230, 240) of the tire 1010 during tire manipulations.

Figure 9:
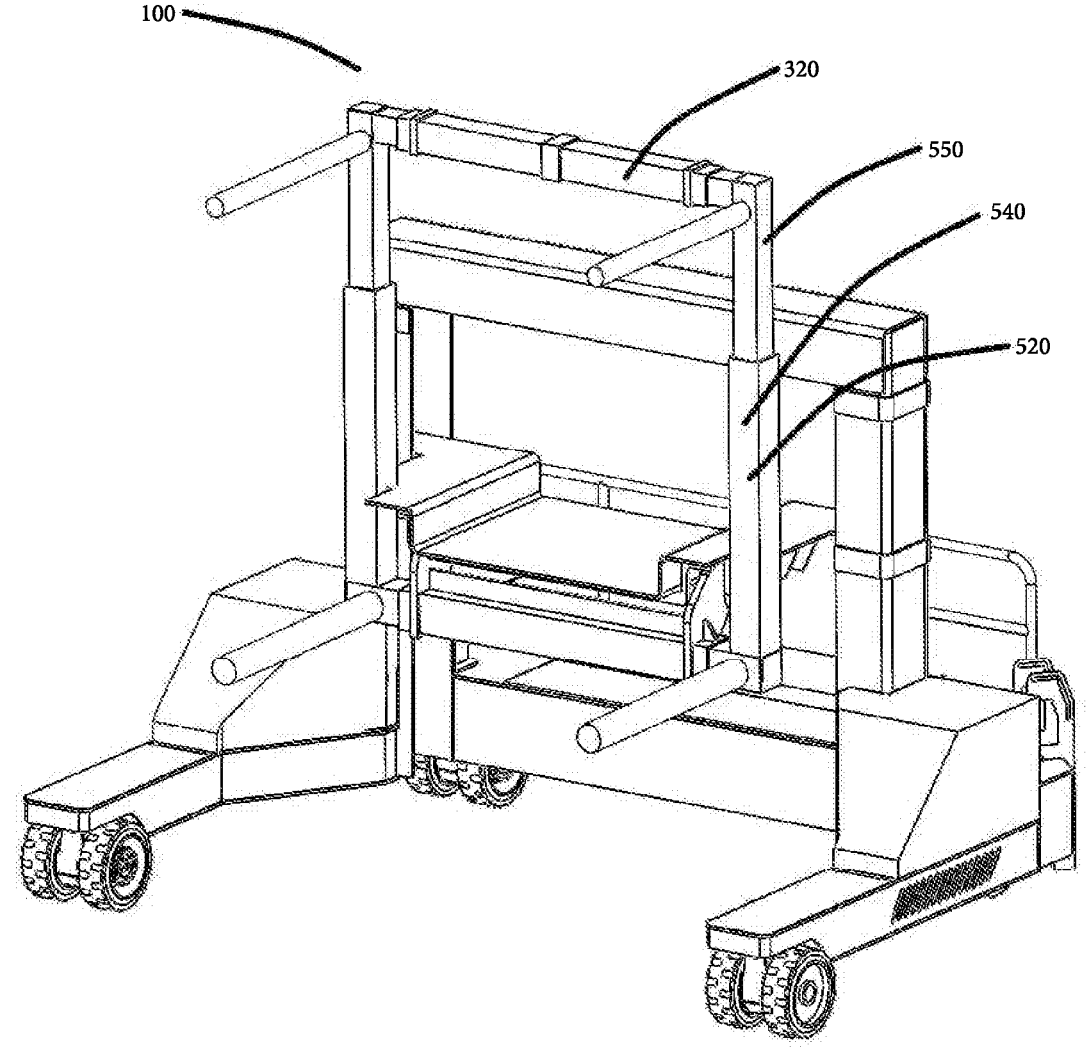
FIG. 9 is a front perspective view illustrating the tire handler of FIG. 1 with the arm assembly thereof shown in a vertical, raised, and contracted position in accordance with an embodiment of the application.
Figure 10:
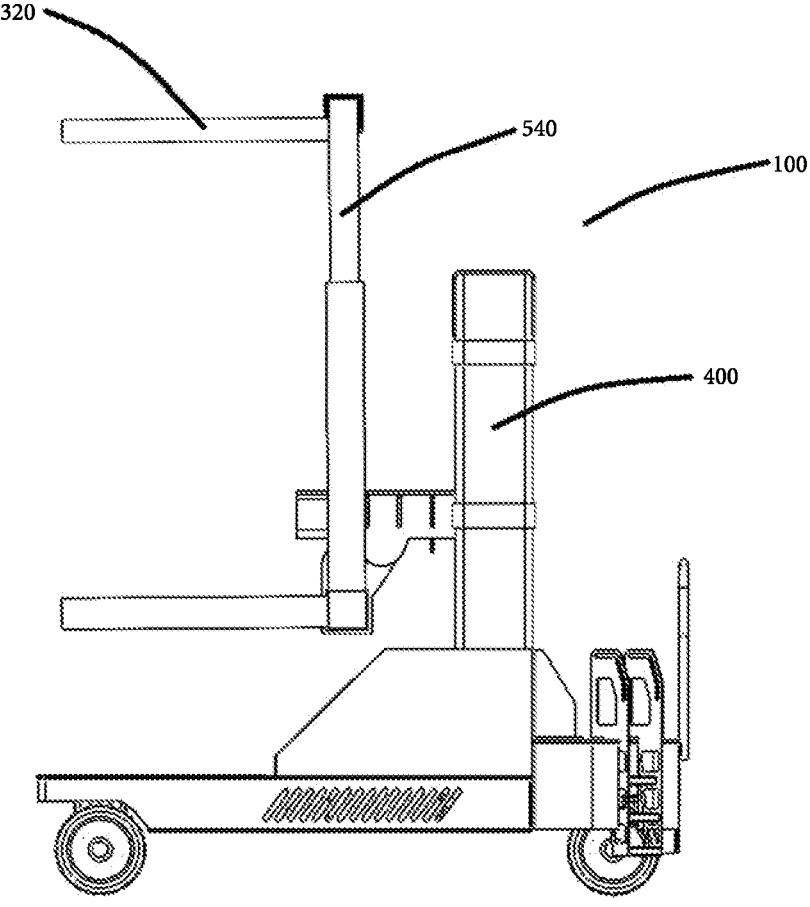
FIG. 10 is a right side view thereof, the left side view being substantially a mirror image thereof.
Figure 11:
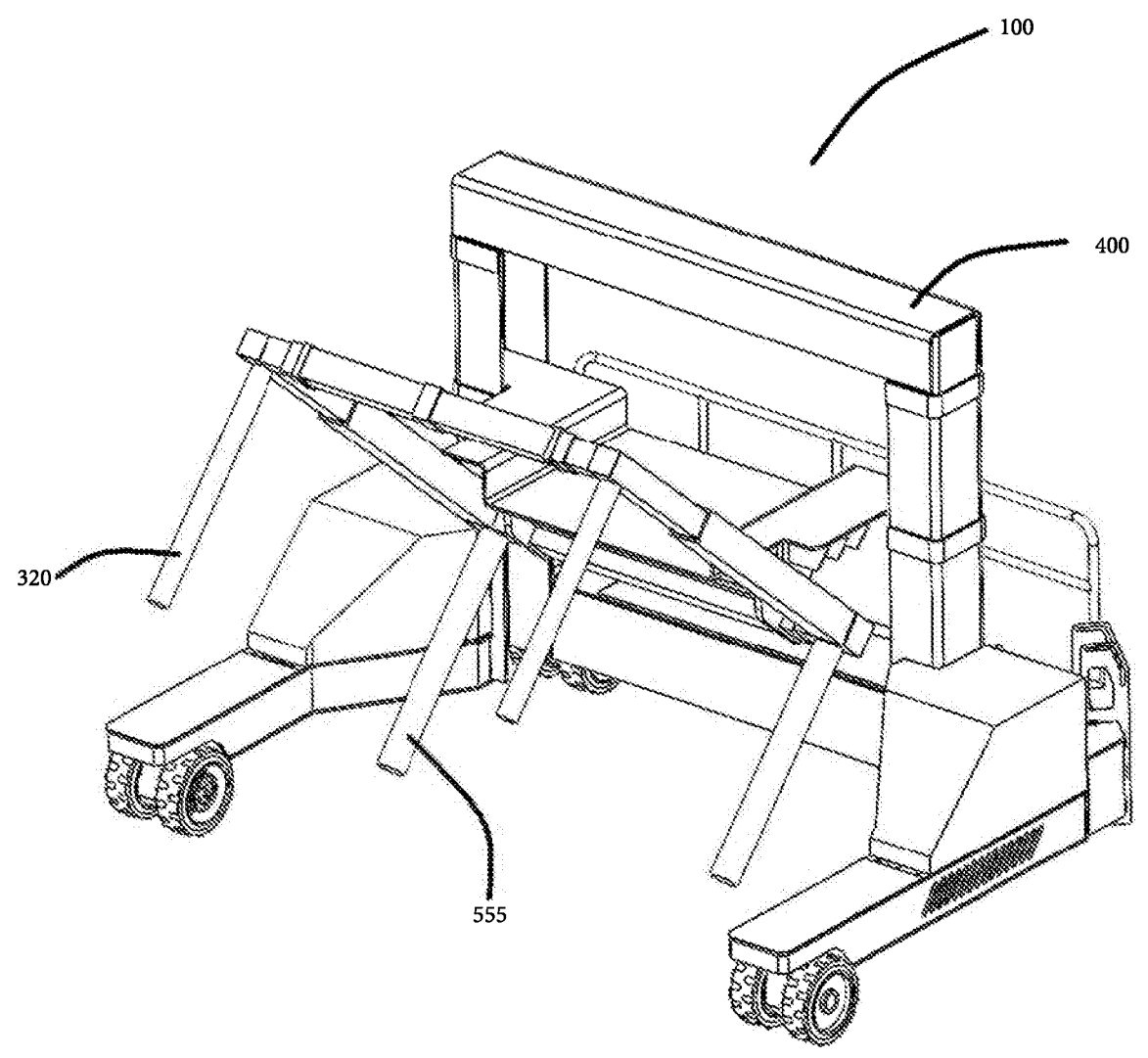
FIG. 11 is a front perspective view illustrating the tire handler of FIG. 1 with the arm assembly thereof shown in a tilted, raised, and contracted position in accordance with an embodiment of the application.
Figure 12:
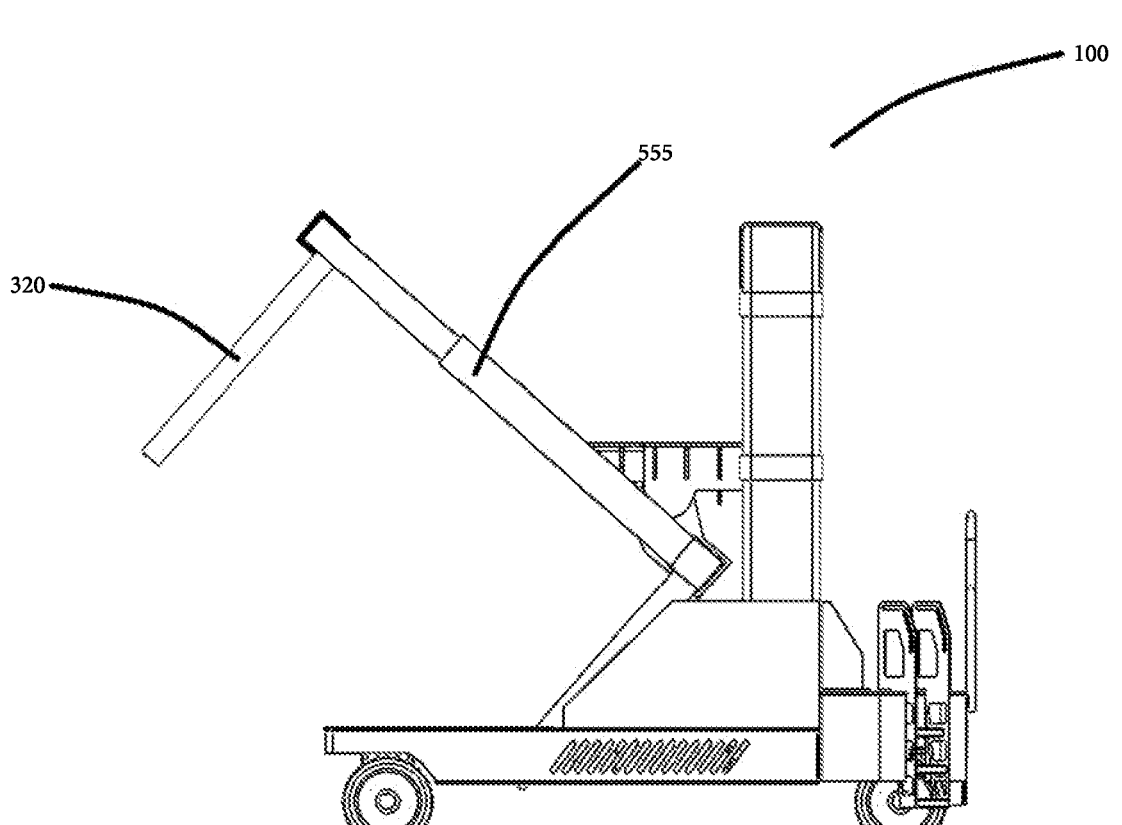
FIG. 12 is a right side view thereof, the left side view being substantially a mirror image thereof.
Figure 13:
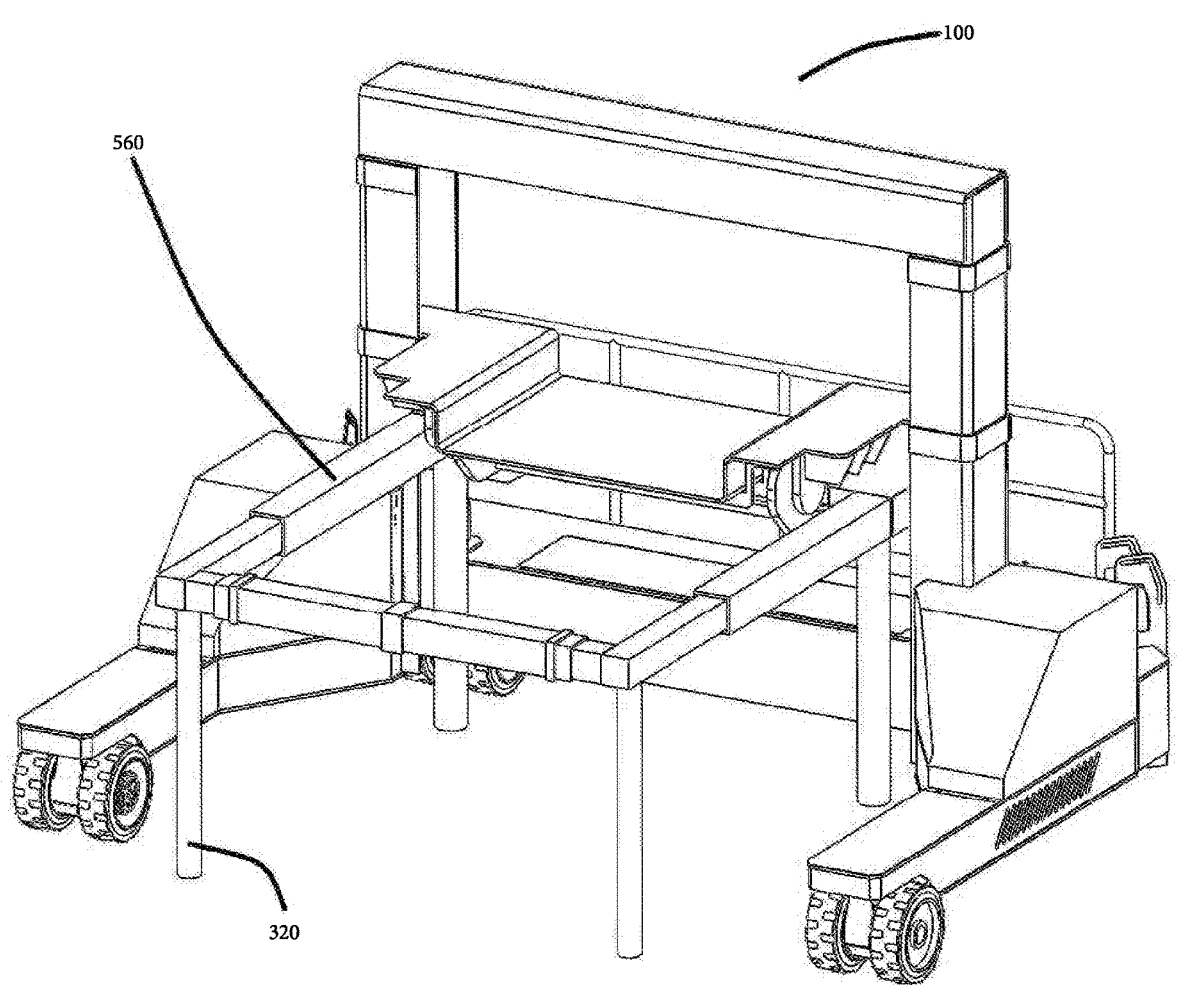
FIG. 13 is a front perspective view illustrating the tire handler of FIG. 1 with the arm assembly thereof shown in a horizontal, raised, and contracted position in accordance with an embodiment of the application.
Figure 14:
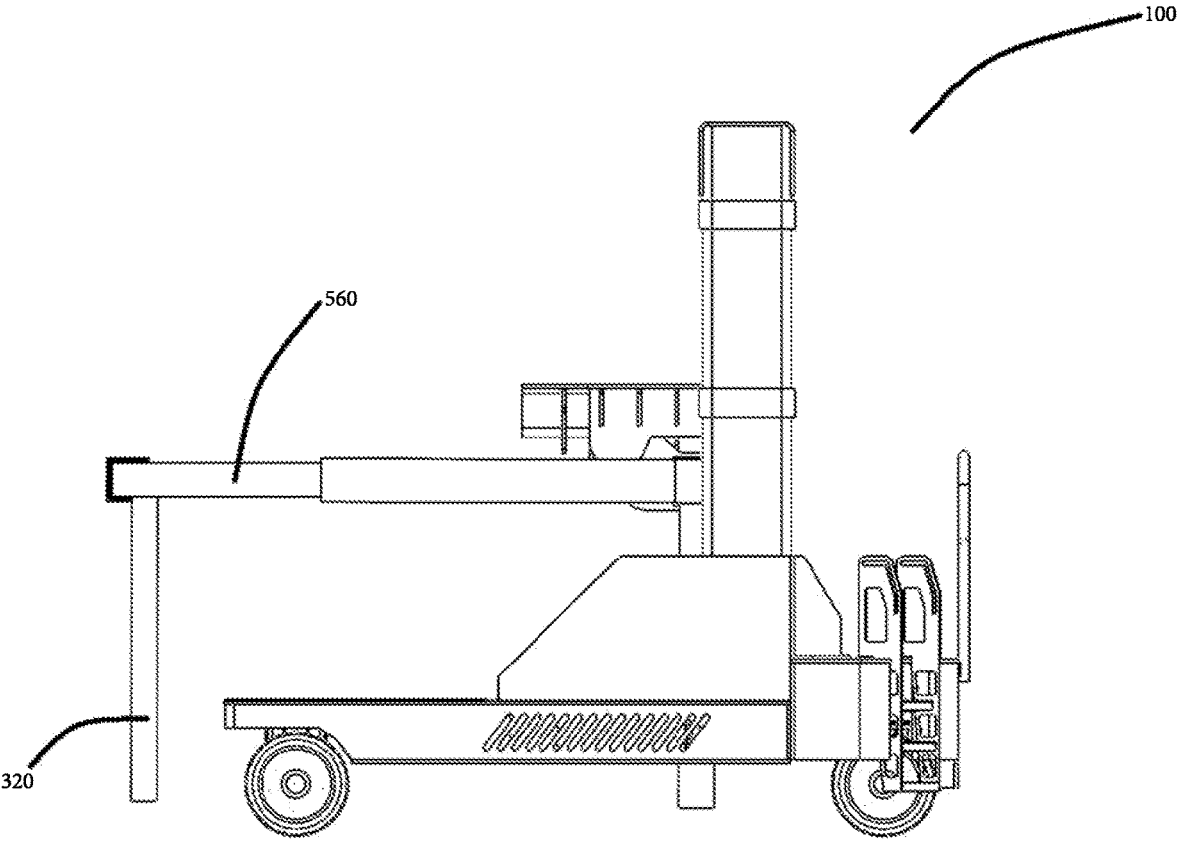
FIG. 14 is a right side view thereof, the left side view being substantially a mirror image thereof.
Figure 15:
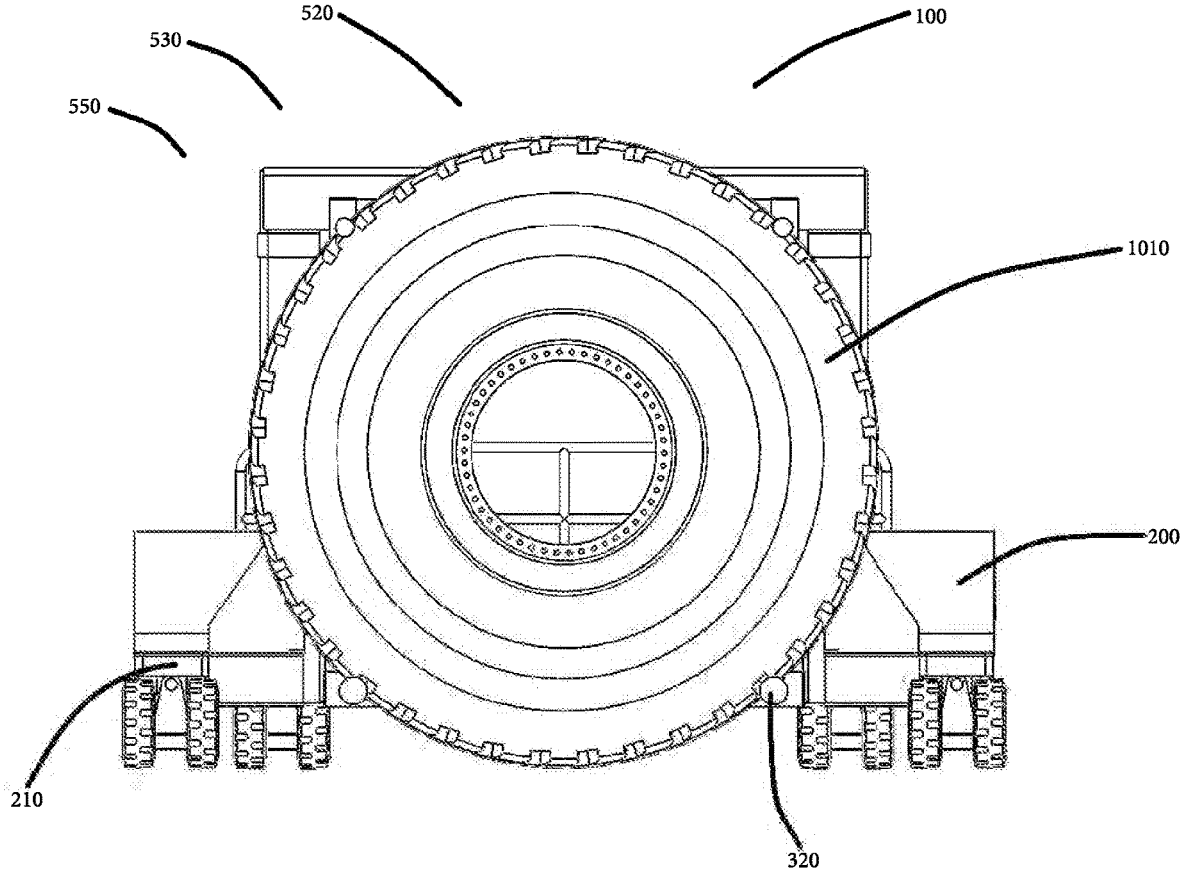
FIG. 15 is a front view illustrating the tire handler of FIG. 1 with the arm assembly thereof shown in a vertical, lowered, and contracted position and gripping a tire in accordance with an embodiment of the application.
Figure 16:
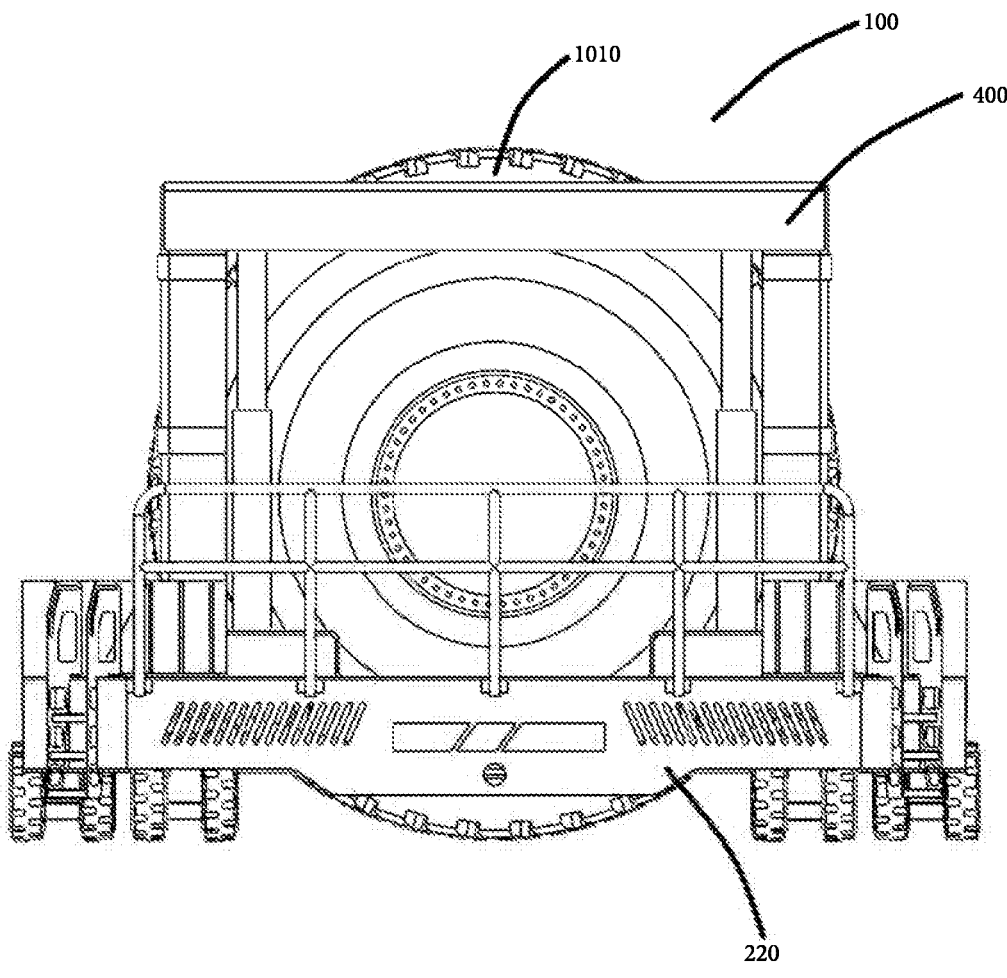
FIG. 16 is a rear view thereof.
Figure 17:
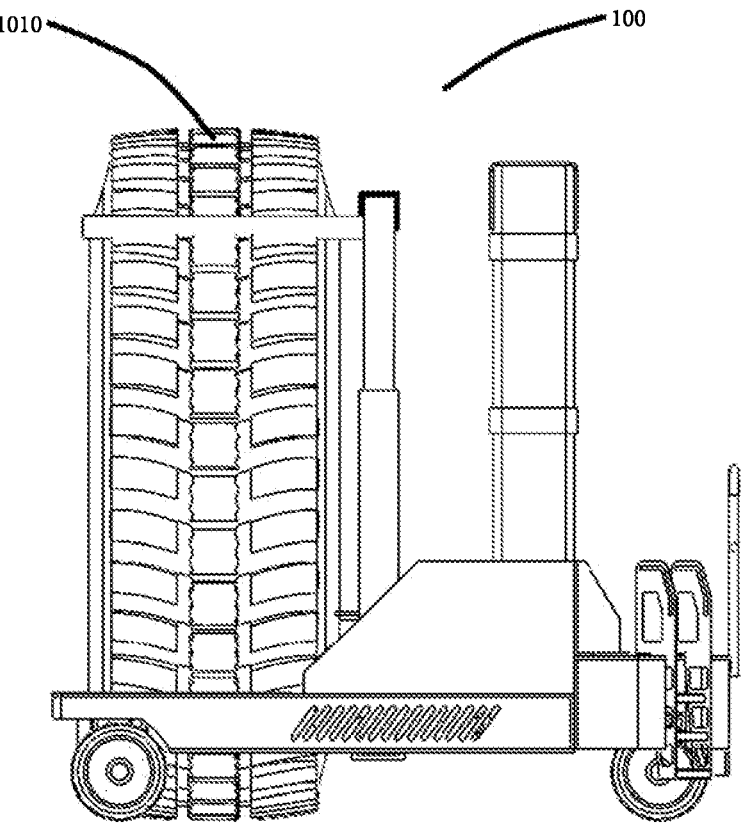
FIG. 17 is a right side view thereof, the left side view being substantially a mirror image thereof.
Figure 19:
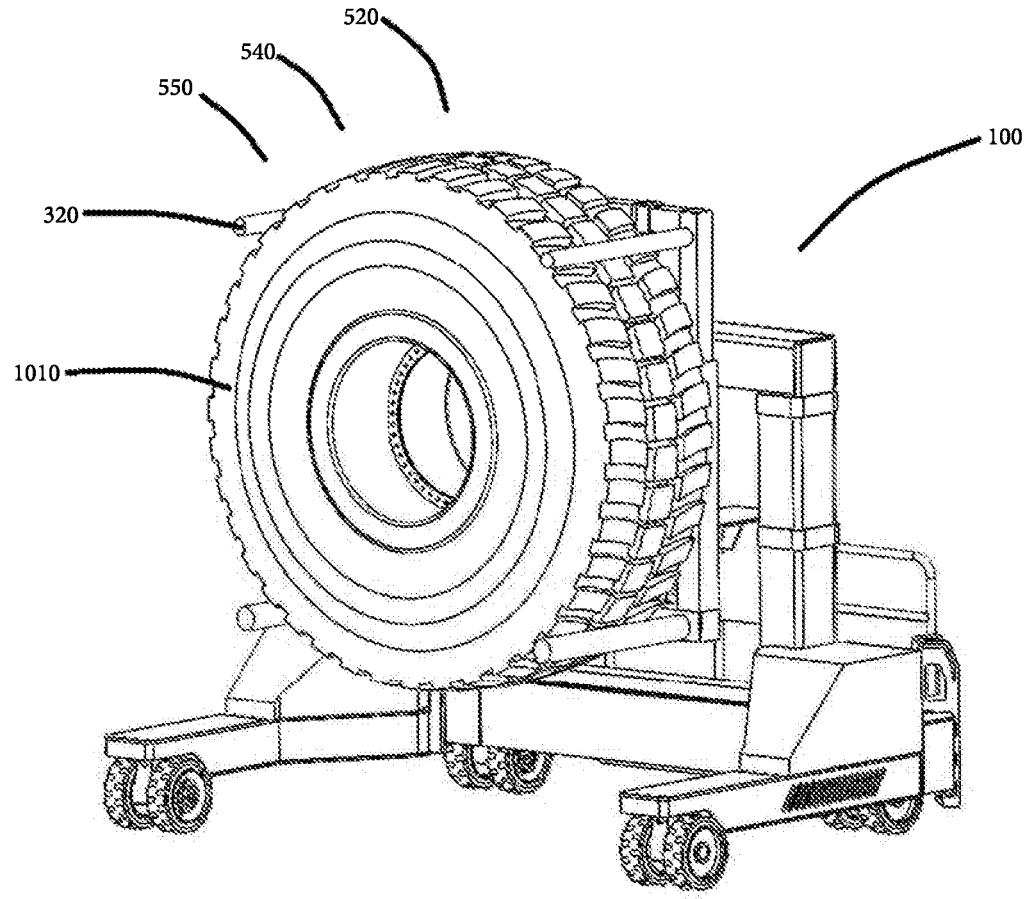
FIG. 19 is a front perspective view illustrating the tire handler of FIG. 1 with the arm assembly thereof shown in a vertical, raised, and contracted position and gripping a tire in accordance with an embodiment of the application.
Figure 20:
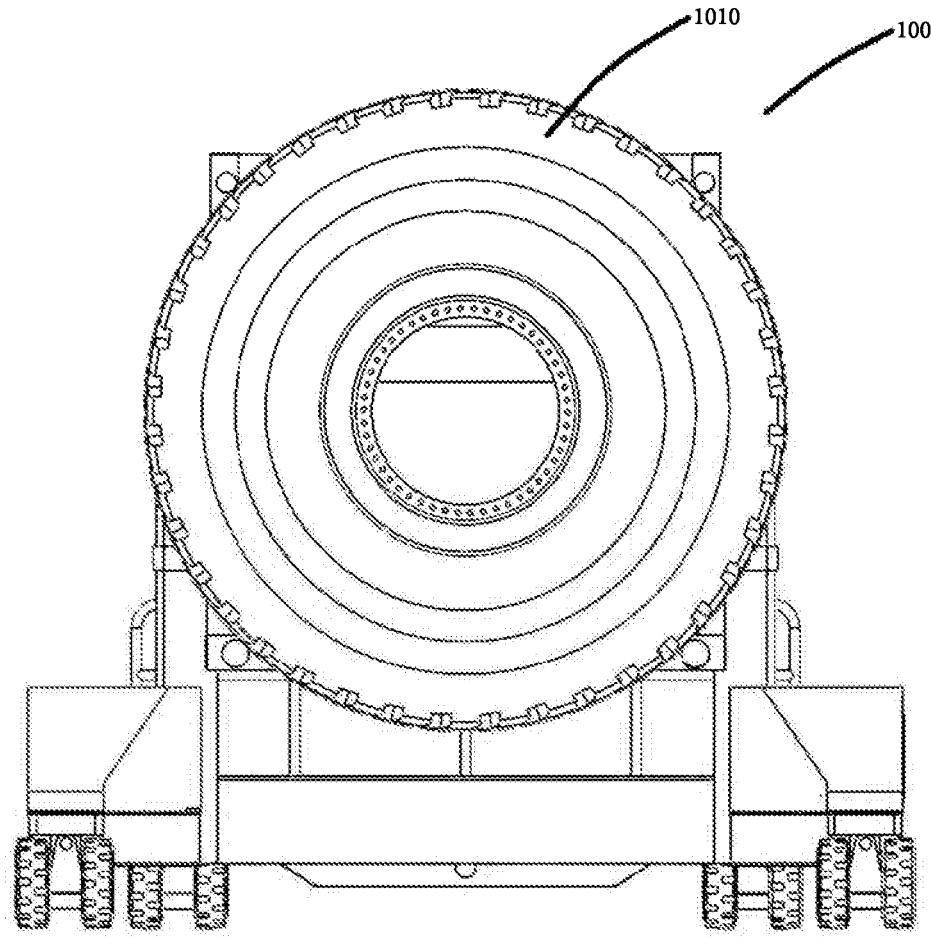
FIG. 20 is a front view thereof.
Figure 21:
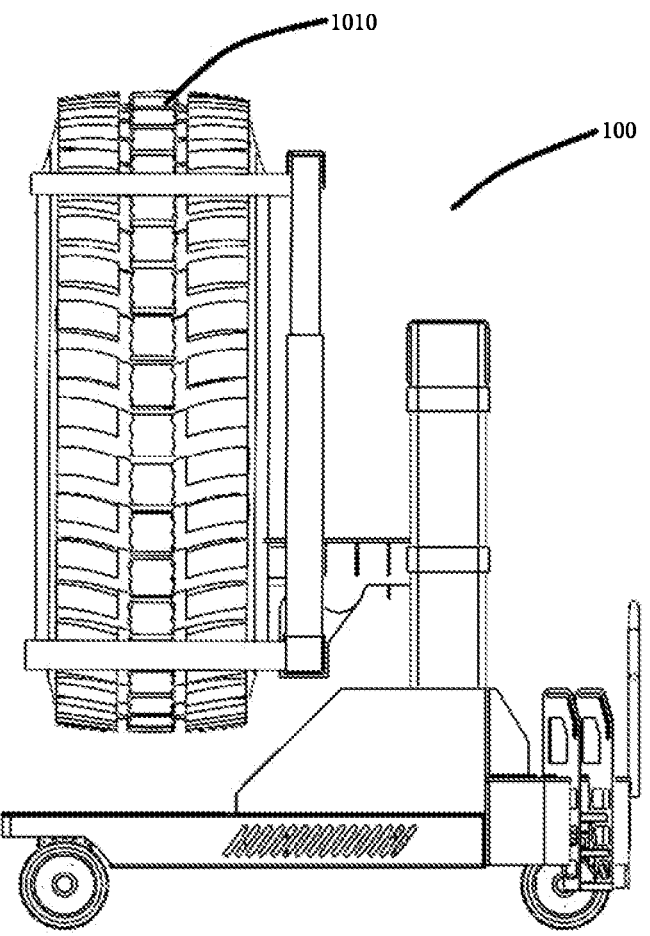
FIG. 21 is a right side view thereof, the left side view being substantially a mirror image thereof.
Figure 22:
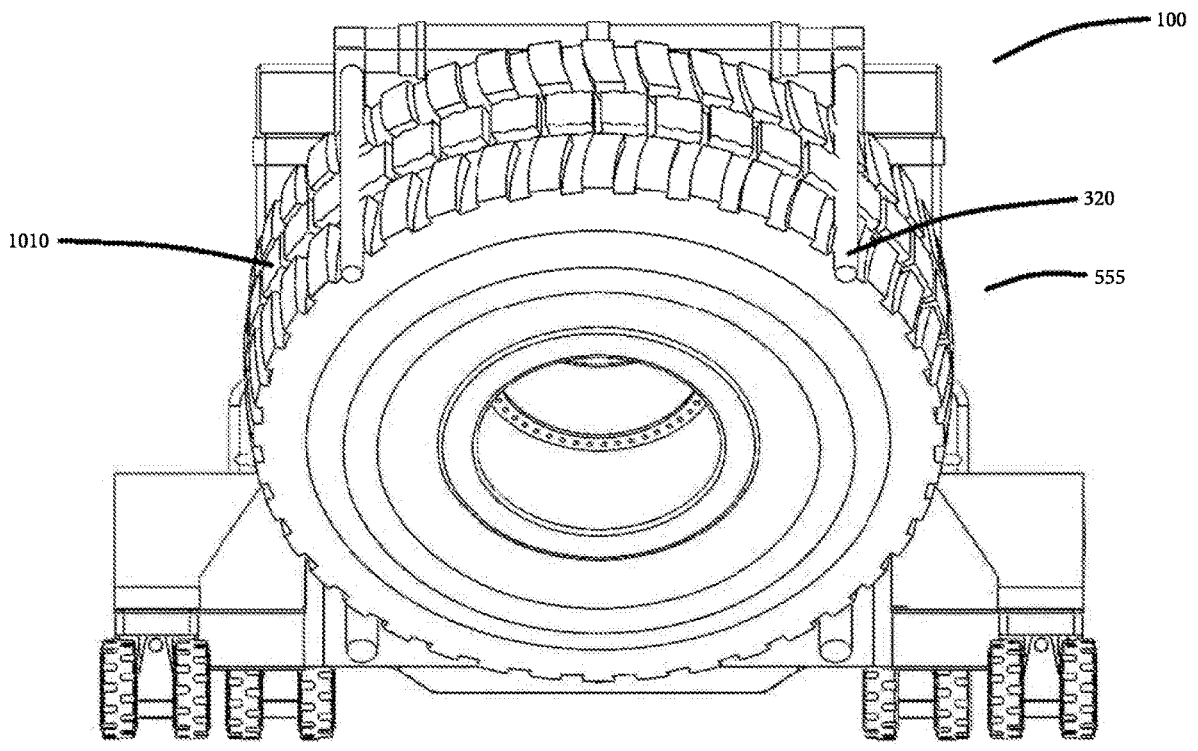
FIG. 22 is a front view illustrating the tire handler of FIG. 1 with the arm assembly thereof shown in a tilted, raised, and contracted position and gripping a tire in accordance with an embodiment of the application.
Figure 23:
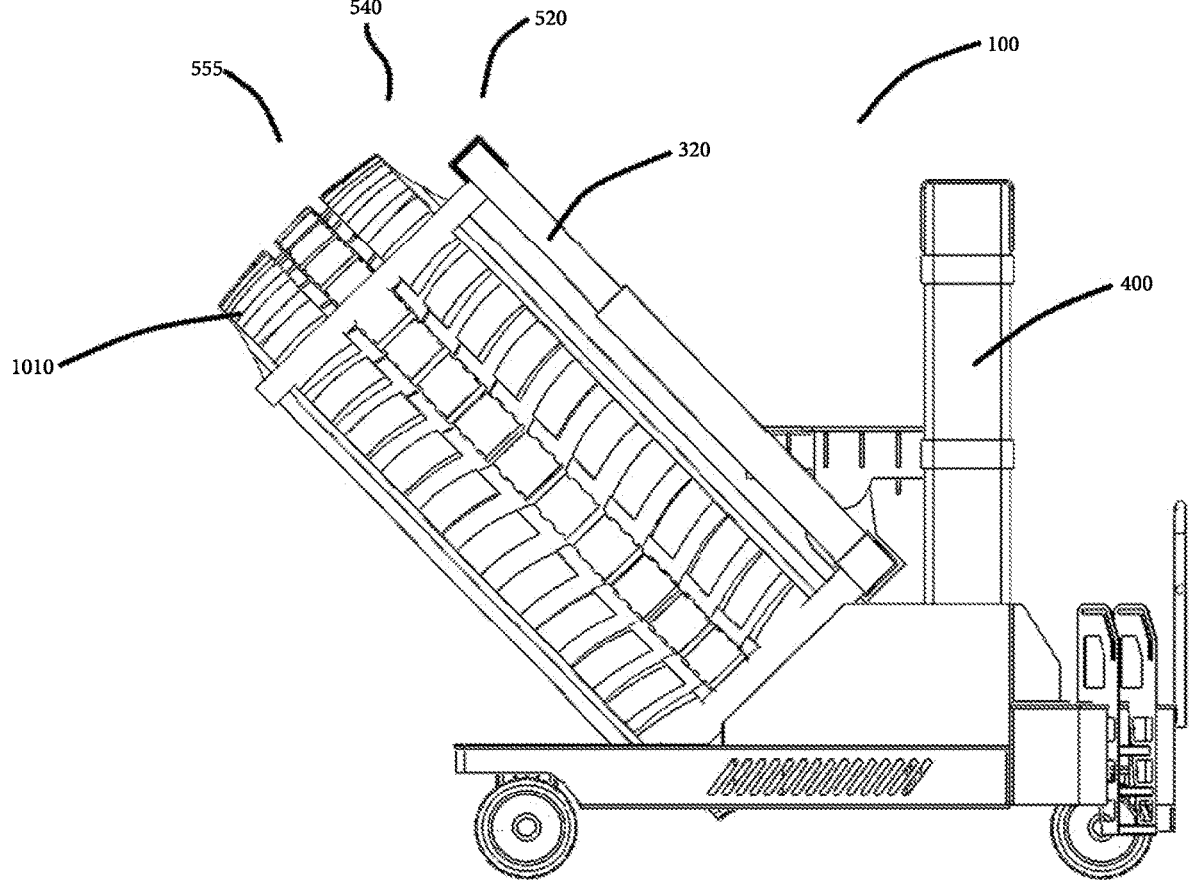
FIG. 23 is a right side view thereof, the left side view being substantially a mirror image thereof.
Figure 24:
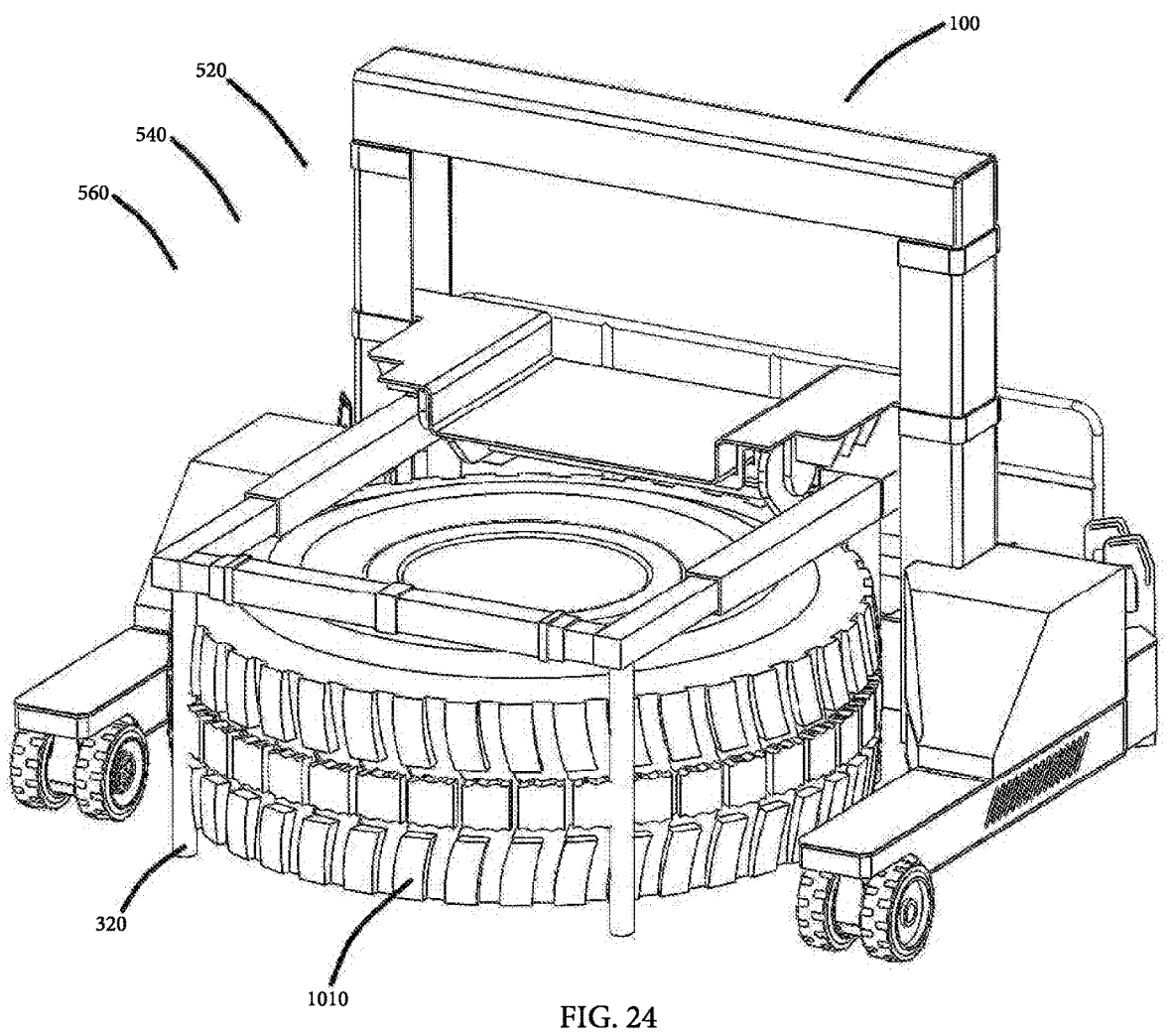
FIG. 24 is a front perspective view illustrating the tire handler of FIG. 1 with the arm assembly thereof shown in a horizontal, raised, and contracted position and gripping a tire in accordance with an embodiment of the application.
Figure 25:
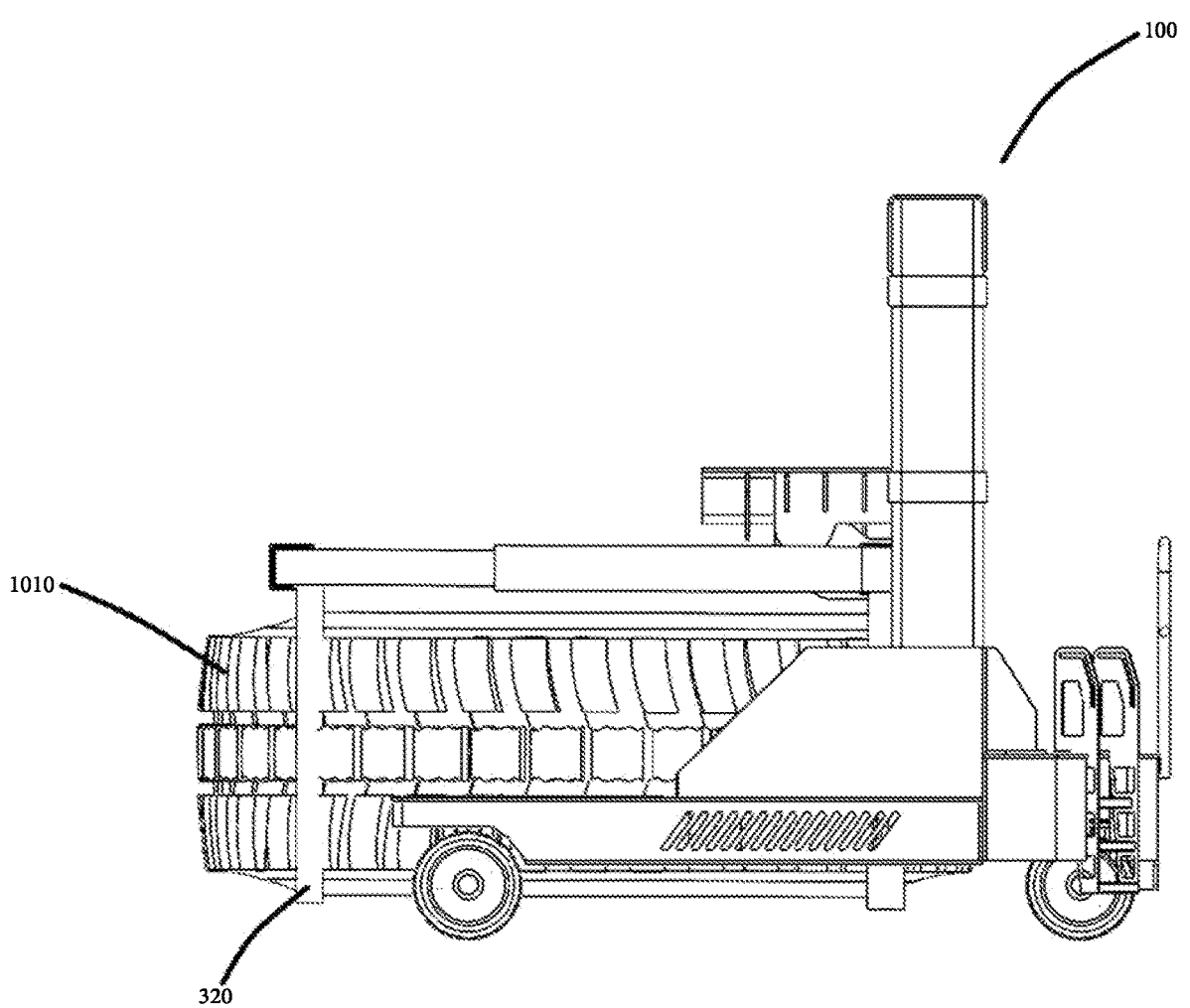
FIG. 25 is a right side view thereof, the left side view being substantially a mirror image thereof.

FIG. 9 is a front perspective view illustrating the tire handler 100 of FIG. 1 with the arm assembly 320 thereof shown in a vertical, raised, and contracted position 550, 540, 520 in accordance with an embodiment of the application. FIG. 10 is a right side view thereof, the left side view being substantially a mirror image thereof. FIG. 11 is a front perspective view illustrating the tire handler 100 of FIG. 1 with the arm assembly 320 thereof shown in a tilted, raised, and contracted position 555, 540, 520 in accordance with an embodiment of the application. FIG. 12 is a right side view thereof, the left side view being substantially a mirror image thereof. FIG. 13 is a front perspective view illustrating the tire handler 100 of FIG. 1 with the arm assembly 320 thereof shown in a horizontal, raised, and contracted position 560, 540, 520 in accordance with an embodiment of the application. FIG. 14 is a right side view thereof, the left side view being substantially a mirror image thereof. FIG. 15 is a front view illustrating the tire handler 100 of FIG. 1 with the arm assembly 320 thereof shown in a vertical, lowered, and contracted position 550, 530, 520 and gripping a tire 1010 in accordance with an embodiment of the application. FIG. 16 is a rear view thereof. FIG. 17 is a right side view thereof, the left side view being substantially a mirror image thereof. FIG. 18 is a top view thereof. FIG. 19 is a front perspective view illustrating the tire handler 100 of FIG. 1 with the arm assembly 320 thereof shown in a vertical, raised, and contracted position 550, 540, 520 and gripping a tire 1010 in accordance with an embodiment of the application. FIG. 20 is a front view thereof. FIG. 21 is a right side view thereof, the left side view being substantially a mirror image thereof. FIG. 22 is a front view illustrating the tire handler 100 of FIG. 1 with the arm assembly 320 thereof shown in a tilted, raised, and contracted position 555, 540, 520 and gripping a tire 1010 in accordance with an embodiment of the application. FIG. 23 is a right side view thereof, the left side view being substantially a mirror image thereof. FIG. 24 is a front perspective view illustrating the tire handler 100 of FIG. 1 with the arm assembly 320 thereof shown in a horizontal, raised, and contracted position 560, 540, 520 and gripping a tire 1010 in accordance with an embodiment of the application. And, FIG. 25 is a right side view thereof, the left side view being substantially a mirror image thereof.

According to one embodiment, the tire gripping assembly 300 has a tilt assembly 310 and an arm assembly 320 coupled (e.g., one or more of attached, connected, joined, bolted, welded, screwed, pinned, hinged, etc.) thereto.

According to one embodiment, the arm assembly 320 has first and second vertical telescoping arms 330, 340 coupled at respective upper and lower ends 3301, 3401, 3302, 3402 to respective first and second ends 3501, 3502, 3601, 3602 of first and second horizontal telescoping arms 350, 360. The first and second horizontal telescoping arms 350, 360 may be double-ended having a moving stage (e.g., 334) at either end of a central barrel (e.g., 335) as described further below. The arm assembly 320 has first and second upper arms 371, 372 and first and second lower arms 373, 374 mounted on the first and second vertical telescoping arms 330, 340 proximate the respective upper and lower ends thereof 3301, 3401, 3302, 3402 (or alternatively 3601, 3602). The first and second upper arms 371, 372 and the first and second lower arms 373, 374 are adapted to grip the tire 1010. The first and second vertical telescoping arms 330, 340 have respective first and second vertical arm actuators 331, 341 mounted or coupled thereto. The first and second horizontal telescoping arms 350, 360 have respective first and second pairs of horizontal arm actuators 351, 352, 361, 362 mounted or coupled thereto.

Figure 31:
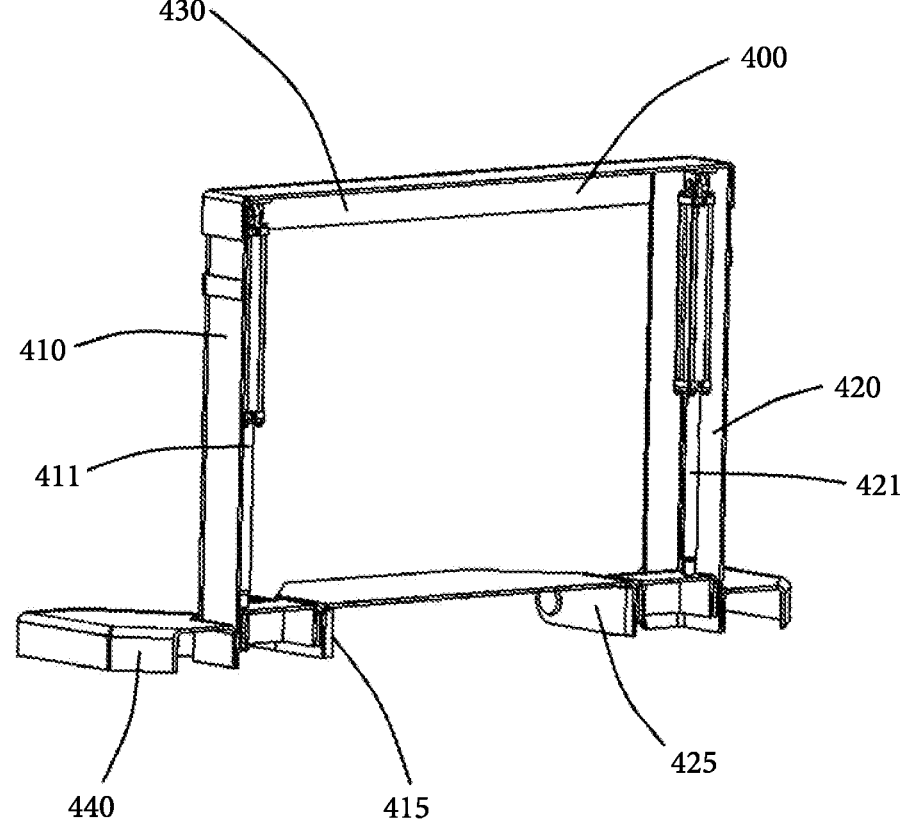
FIG. 31 is a rear perspective cross-sectional view illustrating the lifting assembly of the tire handler of FIG. 1 in accordance with an embodiment of the application.
Figure 32:
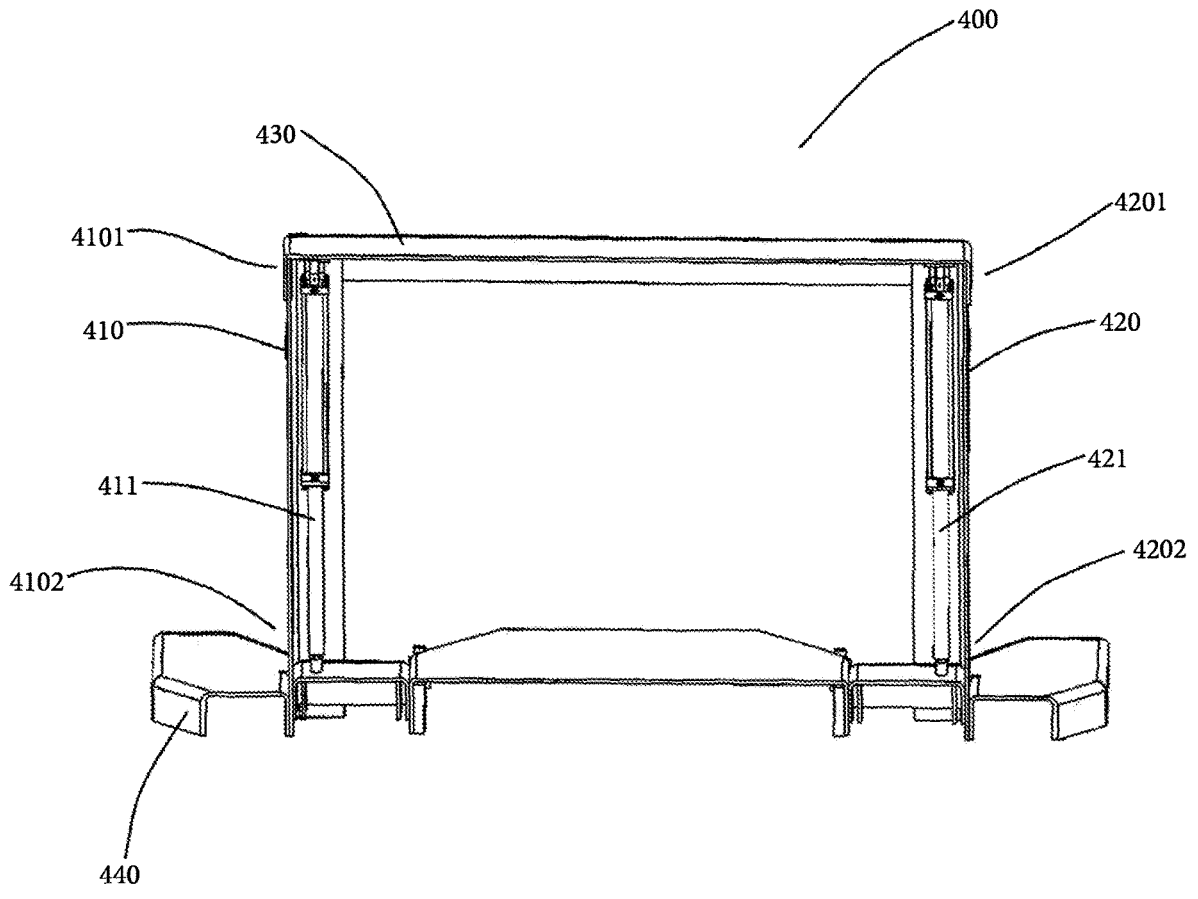
FIG. 32 is a rear view thereof.

FIG. 31 is a rear perspective cross-sectional view illustrating the lifting assembly 400 of the tire handler 100 of FIG. 1 in accordance with an embodiment of the application. And, FIG. 32 is a rear view thereof.

According to one embodiment, the lifting assembly 400 is mounted on the frame 200. The lifting assembly 400 has first and second vertical lift actuators 411, 421 mounted on the frame 200 and coupled (e.g., by shaft or pin 415, 425, etc.) to the tilt assembly 320. The first and second vertical lift actuators 411, 421 may be housed in respective first and second masts 410, 420. The first and second masts 410, 420 may be mounted at respective lower ends 4102, 4202 thereof to a base 440 (which may be mounted to the frame 200) and may be joined or attached at respective upper ends 4101, 4201 thereof by a cross member 430.

Figure 26:
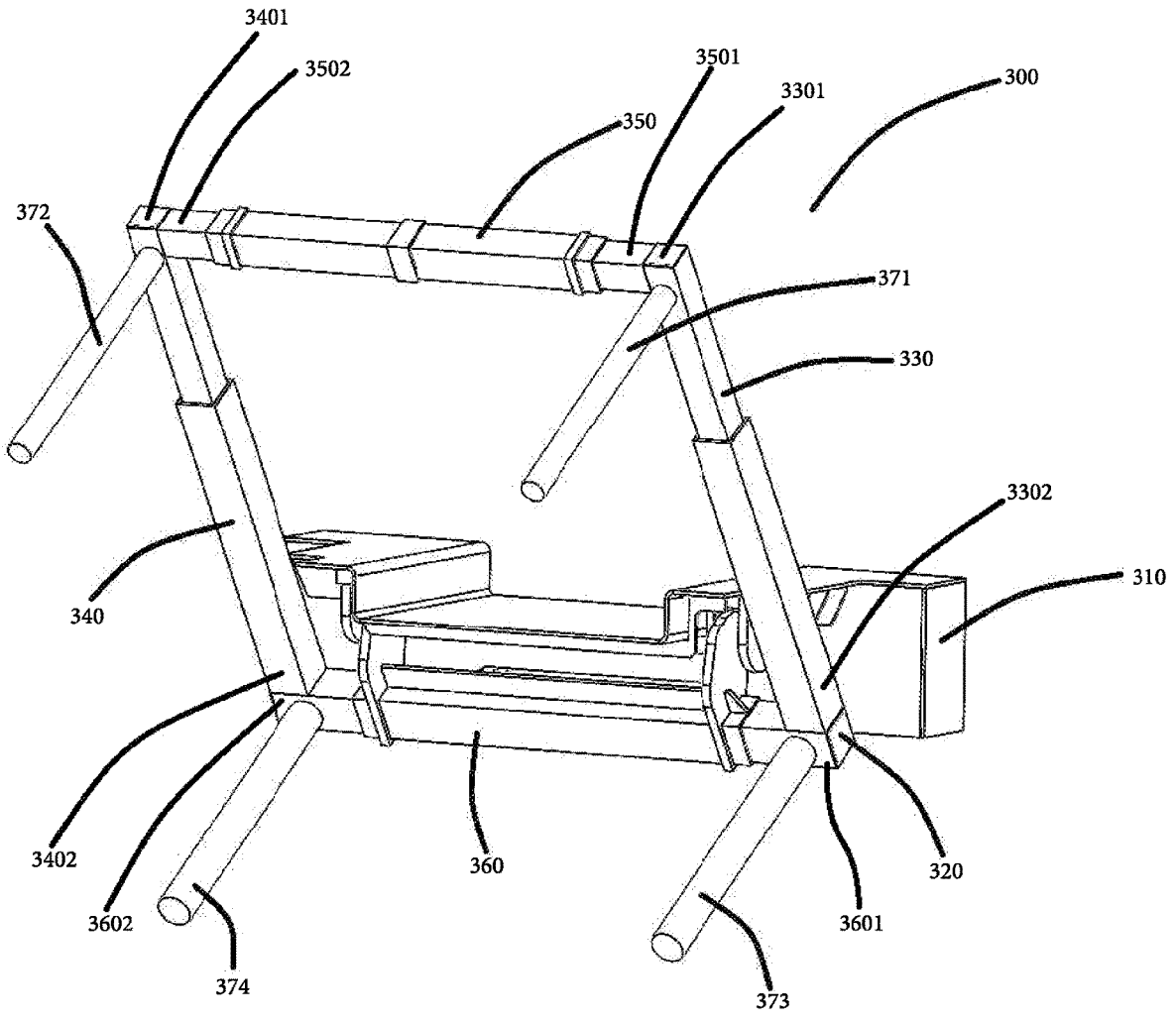
FIG. 26 is a front perspective view illustrating the tire gripping assembly of the tire handler of FIG. 1 with the arm assembly thereof shown in a tilted position in accordance with an embodiment of the application.
Figure 27:
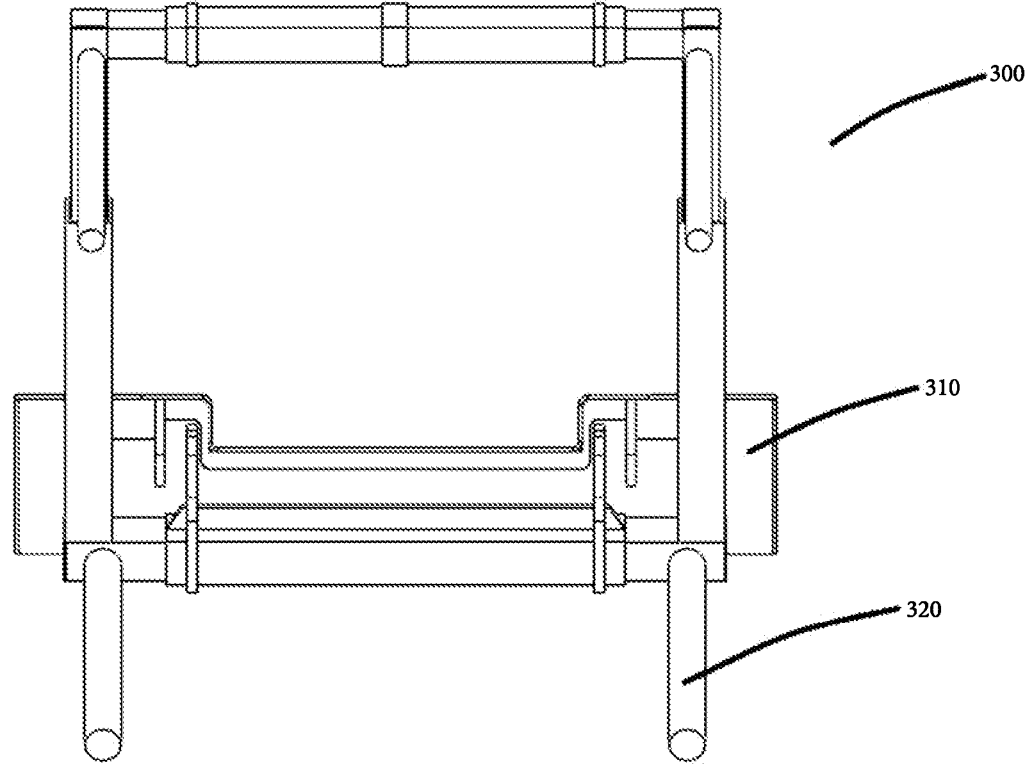
FIG. 27 is a front view thereof.
Figure 28:
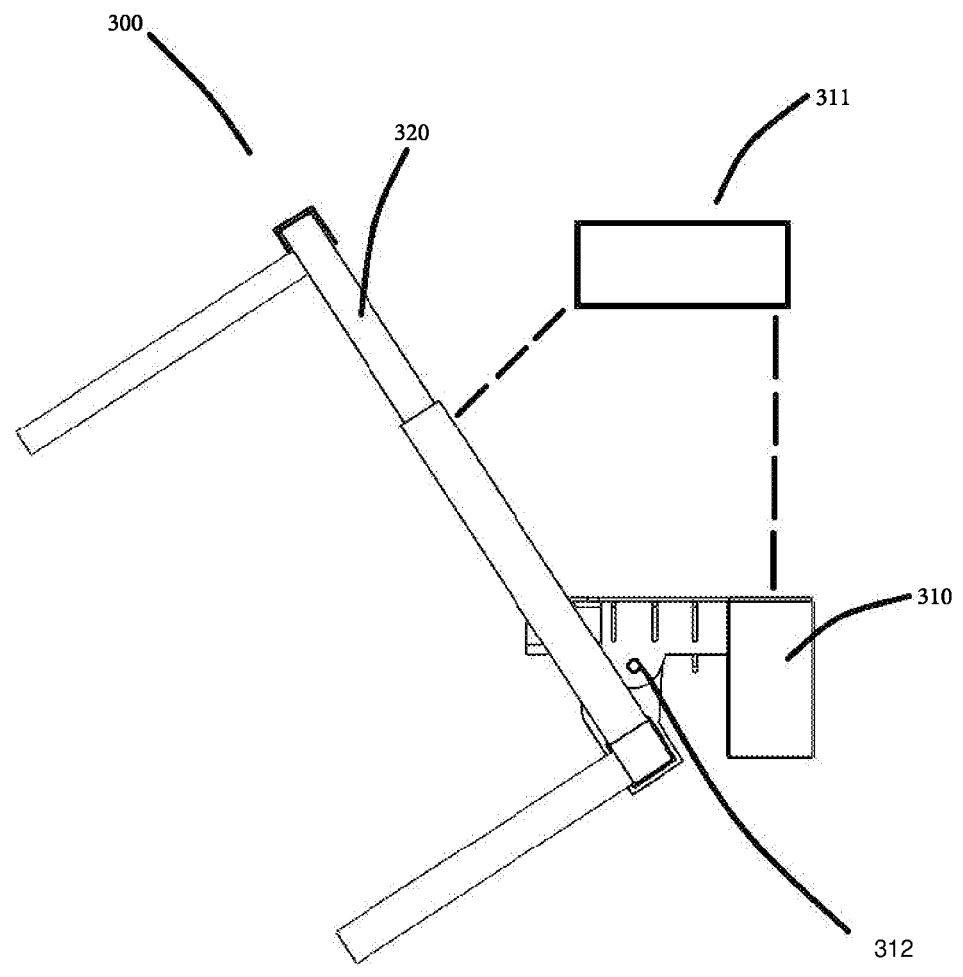
FIG. 28 is a right side view thereof, the left side view being substantially a mirror image thereof.
Figure 29:
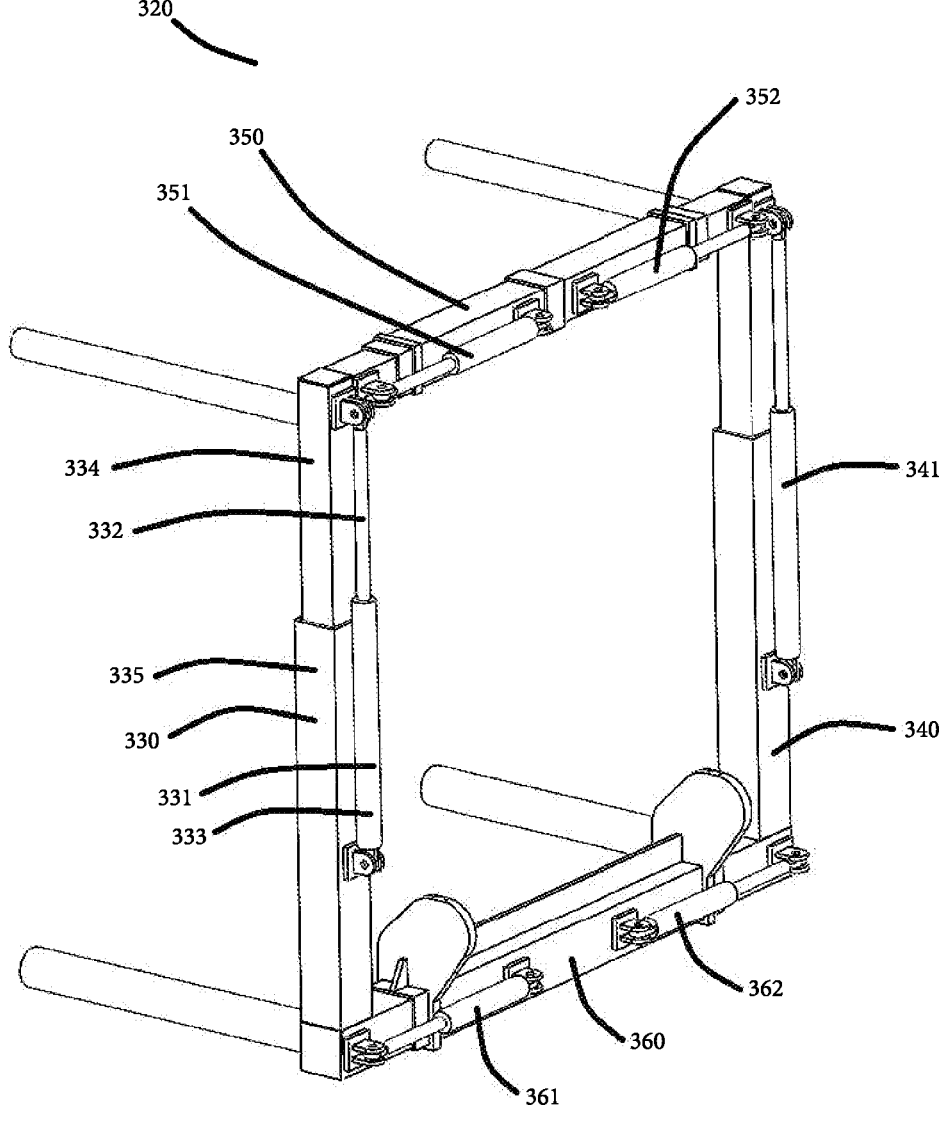
FIG. 29 is a rear perspective view illustrating the arm assembly of the tire handler of FIG. 1 shown in a vertical position in accordance with an embodiment of the application.
Figure 30:
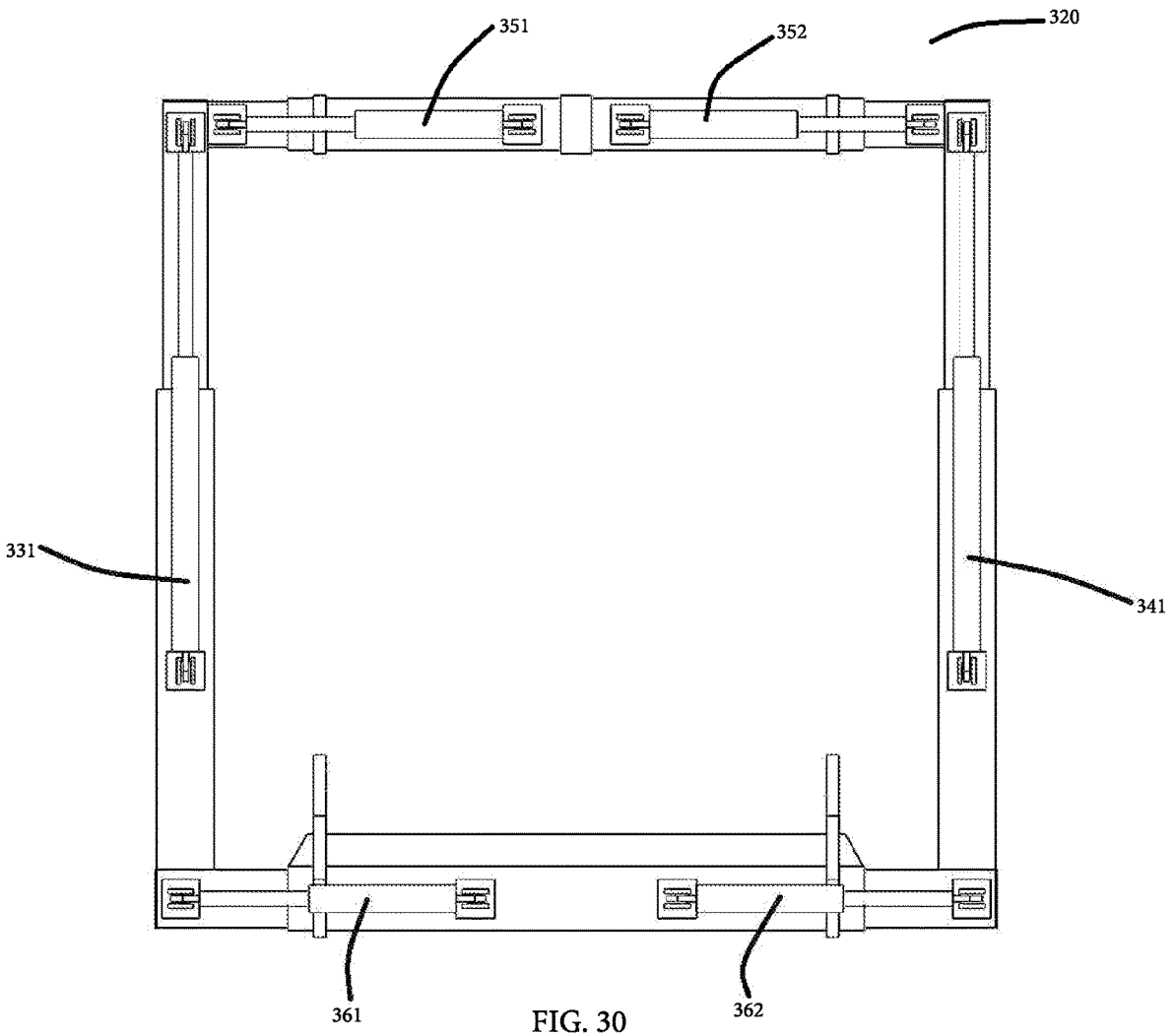
FIG. 30 is a rear view thereof.

FIG. 26 is a front perspective view illustrating the tire gripping assembly 300 of the tire handler 100 of FIG. 1 with the arm assembly 320 thereof shown in a tilted position 555 in accordance with an embodiment of the application. FIG. 27 is a front view thereof. FIG. 28 is a right side view thereof, the left side view being substantially a mirror image thereof. FIG. 29 is a rear perspective view illustrating the arm assembly 320 of the tire handler 100 of FIG. 1 shown in a vertical position 550 in accordance with an embodiment of the application. And, FIG. 30 is a rear view thereof.

The first and second vertical arm actuators 331, 341 and the first and second pairs of horizontal arm actuators 351, 352, 361, 362 are operable (i.e., via corresponding operation of the vertical and horizontal telescoping arms 330, 340, 350, 360) to move the first and second upper and lower arms 371, 372, 373, 374 between an expanded position 510 and a contracted position 520 to thereby release and grip the tire 1010.

The first and second vertical lift actuators 411, 421 are operable to move the tire gripping assembly 300 (including the arm assembly 320) between a lowered position 530 and a raised position 540 to thereby lower and raise the tire 1010.

The tilt assembly 310 is operable to move the arm assembly 320 between a vertical position 550 and a horizonal position 560 (through a tilt position 555) to thereby stand the tire 1010 upright and lay the tire 1010 flat. The tilt assembly 320 may be operated by one or more tilt actuators, gears, or the like 311. The arm assembly 320 may be coupled (e.g., rotatably coupled, etc.) to the tilt assembly 310 by an axle, one or more pins, or the like 312.

According to one embodiment, the actuators (e.g., 331) may be hydraulic cylinders or pneumatic or electric actuators. Each of the cylinders (e.g., 331) may have a piston rod end 332 and a cylinder barrel end 333. According to one embodiment, the telescoping arms (e.g., 330) have at least one moving stage end 334 and a barrel end 335. The piston rod end 333 of the cylinder 331 may be coupled to the moving stage end 334 of the telescoping arm 330 and the cylinder barrel end 333 of the cylinder 331 may be coupled to the barrel end 335 of the telescoping arm 330. According to one embodiment, the actuators 331 may be operable simultaneously.

As mentioned above, the tire handler 100 includes a remote control unit 8000 that allows an operator to maneuver the tire handler 100 beside a truck 1000, grip and remove a tire 1010 from the truck 1000 (i.e., after the truck 1000 has been jacked up), or grip and replace a tire 1010 on the truck 1000, all without the operator having to venture near the truck 1000 or tire 1010.

Figure 33:
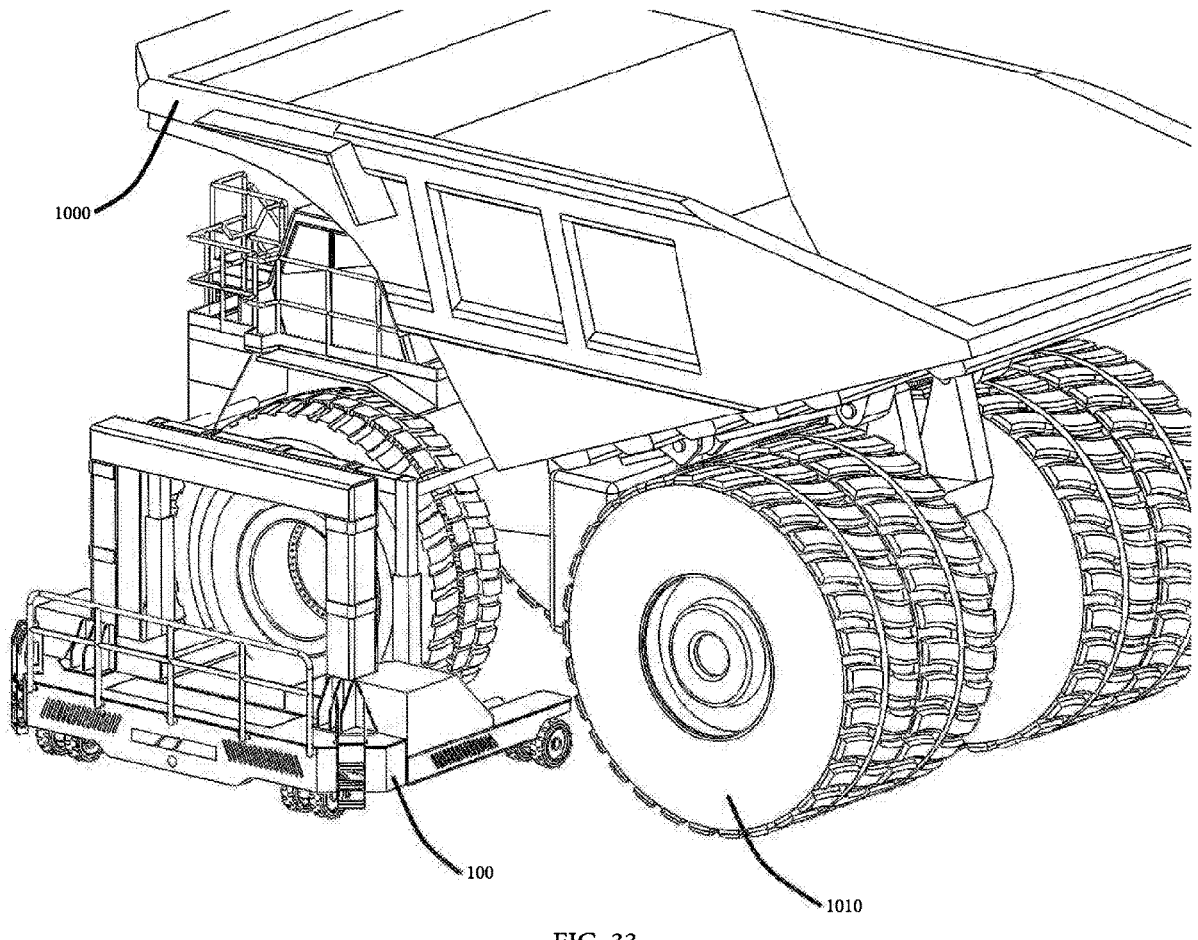
FIG. 33 is a rear perspective view illustrating the tire handler of FIG. 1 with the arm assembly thereof shown in a vertical, lowered, and contracted position and gripping a tire mounted on a truck in accordance with an embodiment of the application; and, FIG. 34 is a rear view thereof.
Figure 34:
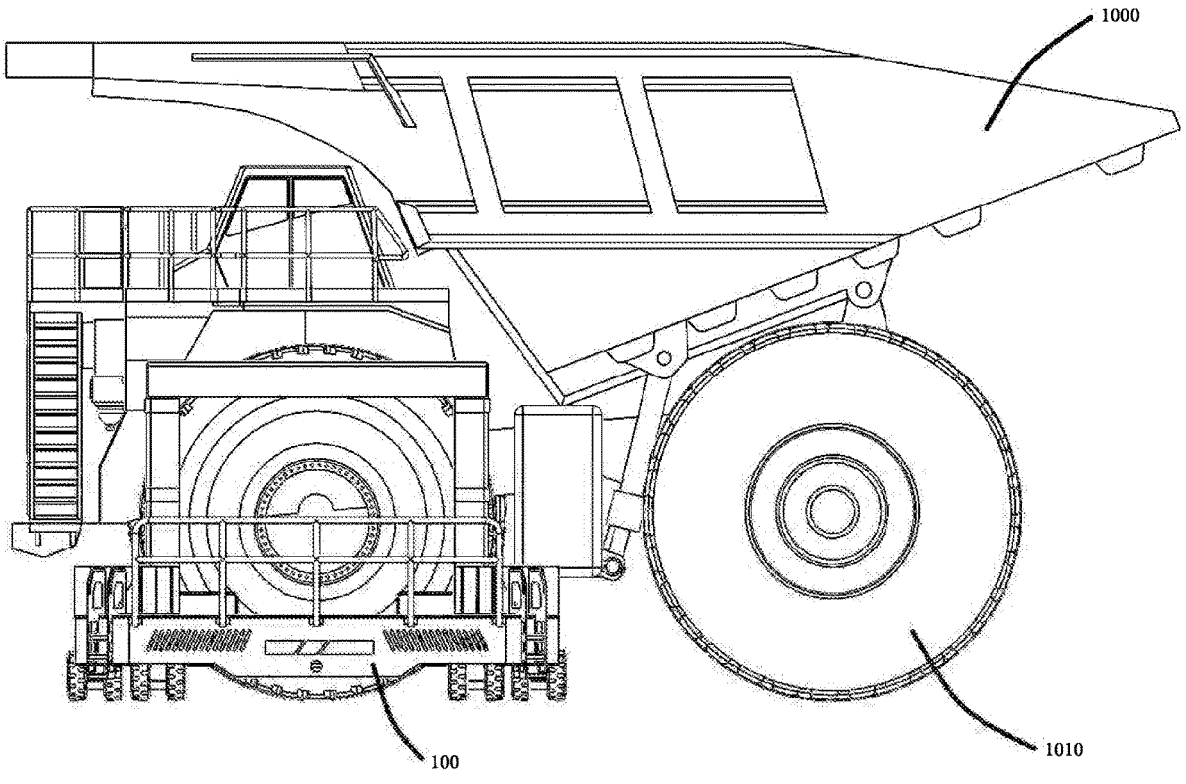

FIG. 33 is a rear perspective view illustrating the tire handler 100 of FIG. 1 with the arm assembly 320 thereof shown in a vertical, lowered, and contracted position 550, 530, 510 and gripping a tire 1010 mounted on a truck 1000 in accordance with an embodiment of the application. And, FIG. 34 is a rear view thereof.

In operation, the tire handler 100 is positioned in front of a tire (or wheel or tire and rim) 1010 mounted on a truck 1000 by an operator using a remote control unit 8000. To grip the tire 1000, the first and second upper and lower arms 371, 372, 373, 374 of the arm assembly 320 are moved to the expanded position 510 and are moved over the tire 1010 by adjusting the position of the tire handler 100. The arms 371, 372, 373, 374 are then moved to the contracted position 520 and the tire 1010 is gripped and removed from the truck 1010. If required, the tire gripping assembly 300 may be lowered 530 or raised 540 to accommodate the position of the tire 1010 on the truck 1000 or during movement of the tire handler 100 and the lateral position of the arms 371, 372, 373, 374 may be adjusted. The tire 1010 may be moved to a shop or other desired location by controlling the position of the tire handler 100. When the tire handler 100 reaches the desired location, the tilt assembly 310 may be used to move the arm assembly 320 from the vertical position 550 to the horizontal position 560, the tire gripping assembly 300 may be lowered 530, and the arms 371, 372, 373, 374 of the arm assembly 320 may be moved from the contracted position 520 to the expanded position 510 to release and lay the tire 1010 down flat. Reverse operations may be used to grip the laid down flat tire 1010 and install it on a truck 1000.

Thus, according to one embodiment, there is provided a tire handler 100 for handling a tire 1010 of a vehicle (e.g., 1000), comprising: a frame 200; a tire gripping assembly 300 having a tilt assembly 310 and an arm assembly 320 coupled thereto; the arm assembly 320 having first and second vertical telescoping arms 330, 340 coupled at respective upper and lower ends 3301, 3302, 3401, 3402 to respective first and second ends 3501, 3601, 3502, 3602 of first and second horizontal telescoping arms 350, 360; the arm assembly 320 having first and second upper arms 371, 372 and first and second lower arms 373, 374 mounted on the first and second vertical telescoping arms 330, 340 proximate the respective upper and lower ends 3301, 3401, 3302, 3402 (or alternatively 3601, 3602) thereof, the first and second upper arms 371, 372 and the first and second lower arms 373, 374 adapted to grip the tire 1010; the first and second vertical telescoping arms 330, 340 having respective first and second vertical arm actuators 331, 341; the first and second horizontal telescoping arms 350, 360 having respective first and second pairs of horizontal arm actuators 351, 352, 361, 362; and, a lifting assembly 400 mounted on the frame 200, the lifting assembly 400 having first and second vertical lift actuators 411, 421 mounted on the frame 200 and coupled to the tilt assembly 310; wherein the first and second vertical arm actuators 331, 341 and the first and second pairs of horizontal arm actuators 351, 352, 361, 362 are operable to move the first and second upper and lower arms 371, 372, 373, 374 between an expanded position 510 and a contracted position 520 to thereby release and grip the tire 1010; wherein the first and second vertical lift actuators 411, 421 are operable to move the tire gripping assembly 300 between a lowered position 530 and a raised position 540 to thereby lower and raise the tire 1010; and, wherein the tilt assembly 310 is operable to move the arm assembly 320 between a vertical position 550 and a horizonal position 560 to thereby stand upright and lay flat the tire 1010.

The above tire handler 100 may further include a remote control unit 800 for remotely controlling operations of the tire handler 100. The tire handler 100 may further include a pair of front wheels 261, 262 mounted proximate to a front end 210 of the frame 200 and a pair of rear wheels 271, 272 mounted proximate to a rear end 220 of the frame 200. The tire handler 100 may further include a battery 285 mounted on the frame 200 for providing power to components (e.g., 261, 280, 331, etc.) of the tire handler 100. The vehicle 1000 may be a truck or large capacity truck. The tire handler 100 may be remotely controllable. The tire handler 100 may be locally controllable. The frame 200 may include a platform or deck 250 for use by an operator. The actuators (e.g., 331) may be hydraulic cylinders. The tilt assembly 310 may include at least one tilt actuator 311 mounted thereto and operatively coupled to the arm assembly 320, the at least one tilt actuator 311 operable to move the arm assembly 320 between the vertical position 550 and the horizonal position 560. The arm assembly 320 may be coupled to the tilt assembly by an axle or by one or more pins 312. The tire 1010 may be a wheel including the tire and a tire rim. The frame 200 may be U-shaped or approximately U-shaped having a first leg 203, a second leg 204, and a central portion 202. The tire gripping assembly 300 may extend from the lifting assembly 400 mounted proximate the central portion 202 between the first and second legs 203, 204 of the frame 200. The tire handler 100 may be self-propelled having a motor or engine 280 mounted on the frame 200. The first and second pairs of horizontal arm actuators 351, 352, 361, 362 may be further operable to move the first and second upper and lower arms 371, 372, 373, 374 laterally to thereby shift the tire 1010 laterally when gripped. And, the first and second horizontal telescoping arms 350, 360 may be double-ended thereby allowing the first and second upper and lower arms 371, 372, 373, 374 to be moved laterally.

The above embodiments may contribute to an improved tire handler 100 for handling the tires (e.g., 1010) of large capacity trucks 1000 and may provide one or more advantages. First, the tire handler 100 reduces the shop space to equipment size problem identified above. Second, the compact design of the tire handler 100 allows it to fit into shop environments. Third, the tire handler 100 is easy to use and nimble enough to maneuver in tight spaces. Fourth, the tire handler 100 has omni steer capabilities allowing it to crab crawl around tight shop situations. Fifth, the tire handler 100 may handle a range of large capacity truck tires 1010 from the smallest tires (e.g., 5 tons) to the largest tires (e.g., tons). Sixth, the tire handler 100 is capable of laying a tire 1010 down flat on the ground or other surface. Seventh, the tire handler 100 is purposely built for tires 1010 and not as a forklift modification or attachment. As such, there are no forklift masts or other obstructions that an operator or tire technician must work around. Eighth, the tire handler 100 has a work platform or deck 250 for operators or tire technicians. Ninth, the tire handle 100 may be operated by remote control by a single operator with no need for a secondary worker on the ground to spot. Tenth, the tire handler 100 has a frame 200 that is designed to reduce cantilever load (i.e., reduces the need for reach on the gripper arms 371, 372, 373, 374). Eleventh, the tire handler 100 has uniquely designed robotic gripper arms 371, 372, 373, 374 that provide full control over tire installation/manipulation operations. Twelfth, the tire handler 100 may be battery powered or hybrid diesel over electric powered for shop use and carbon footprint reduction. Thirteenth, the tire handler 100 supports the integration of robotic tool technology (e.g., for wheel nut removal and installation). Fourteenth, the tire handler 100 has wireless communication capabilities for mine ERP systems. Fifteenth, the bolted frame 200 with profile plating support simple shipping and parts replacement. Sixteenth, the tire handler 100 improves safety conditions for operators and tire service technicians. Seventeenth, the tire handler 100 increases truck availability. Eighteenth, the tire handler 100 increases shop bay use (i.e., the ability to handle tires 1010 with occupied adjacent bays). Nineteenth, the tire handler 100 reduces long-term operating costs such as damage to tires, studs, and valve stems due to the problems with using existing devises (e.g., fork lifts, large front end loaders, etc.). And, twentieth, the tire handler

100 reduce carbon footprint (e.g., by using a 60 hp engine or by using battery power versus large loaders having 1200 hp engines).

The embodiments of the application described above are intended to be exemplary only. Those skilled in this art will understand that various modifications of detail may be made to these embodiments, all of which come within the scope of the application.

What is claimed is:

1. A tire handler for handling a tire of a vehicle, comprising:

a frame;

a tire gripping assembly having a tilt assembly and an arm assembly coupled thereto; the arm assembly having first and second vertical telescoping arms coupled at respective upper and lower ends to respective first and second ends of first and second horizontal telescoping arms; the arm assembly having first and second upper arms and first and second lower arms mounted on the first and second vertical telescoping arms proximate the respective upper and lower ends thereof; the first and second upper arms and the first and second lower arms adapted to grip the tire; the first and second vertical telescoping arms having respective first and second vertical arm actuators; the first and second horizontal telescoping arms having respective first and second pairs of horizontal arm actuators; and, a lifting assembly mounted on the frame, the lifting assembly having first and second vertical lift actuators mounted on the frame and coupled to the tilt assembly;

wherein the first and second vertical arm actuators and the first and second pairs of horizontal arm actuators are operable to move the first and second upper and lower arms between an expanded position and a contracted position to thereby release and grip the tire;

wherein the first and second vertical lift actuators are operable to move the tire gripping assembly between a lowered position and a raised position to thereby lower and raise the tire; and, wherein the tilt assembly is operable to move the arm assembly between a vertical position and a horizonal position to thereby stand upright and lay flat the tire.

2. The tire handler of claim 1, further comprising a remote control unit for remotely controlling operations of the tire handler.

3. The tire handler of claim 2, further comprising a pair of front wheels mounted proximate to a front end of the frame and a pair of rear wheels mounted proximate to a rear end of the frame.

4. The tire handler of claim 1, further comprising a battery mounted on the frame for providing power to components of the tire handler.

5. The tire handler of claim 1, wherein the vehicle is a truck or large capacity truck.

6. The tire handler of claim 1, wherein the tire handler is remotely controllable.

7. The tire handler of claim 1, wherein the tire handler is locally controllable.

8. The tire handler of claim 1, wherein the frame includes a platform or deck for use by an operator.

9. The tire handler of claim 1, wherein the actuators are hydraulic cylinders.

10. The tire handler of claim 1, wherein the tilt assembly includes at least one tilt actuator mounted thereto and operatively coupled to the arm assembly, the at least one tilt actuator operable to move the arm assembly between the vertical position and the horizonal position.

11. The tire handler of claim 10, wherein the arm assembly is coupled to the tilt assembly by an axle or by one or more pins.

12. The tire handler of claim 1, wherein the tire is a wheel including the tire and a tire rim.

13. The tire handler of claim 1, wherein the frame is U-shaped or approximately U-shaped having a first leg, a second leg, and a central portion.

14. The tire handler of claim 13, wherein the tire gripping assembly extends from the lifting assembly mounted proximate the central portion between the first and second legs of the frame.

15. The tire handler of claim 1, wherein the tire handler is self-propelled having a motor or engine mounted on the frame.

16. The tire handler of claim 1, wherein the first and second pairs of horizontal arm actuators are further operable to move the first and second upper and lower arms laterally to thereby shift the tire laterally when gripped.

17. The tire handler of claim 1, wherein the first and second horizontal telescoping arms are double-ended thereby allowing the first and second upper and lower arms to be moved laterally.

* * * * *